(12) United States Patent
Isozaki et al.

(10) Patent No.: US 8,520,478 B2
(45) Date of Patent: Aug. 27, 2013

(54) READOUT DEVICE, READOUT METHOD, PROGRAM, AND PROGRAM RECORDING MEDIUM

(75) Inventors: Masaaki Isozaki, Kanagawa (JP); Ryuji Takatsuka, Tokyo (JP); Masaaki Fukuda, Saitama (JP); Kazuyuki Saito, Kanagawa (JP)

(73) Assignee: Sony Corporation (JP)

( * ) Notice: Subject to any disclaimer, the term of this patent is extended or adjusted under 35 U.S.C. 154(b) by 762 days.

(21) Appl. No.: 11/480,220

(22) Filed: Jun. 29, 2006

(65) Prior Publication Data

US 2007/0019520 A1    Jan. 25, 2007

(30) Foreign Application Priority Data

Jun. 29, 2005  (JP) .............................. P2005-189815

(51) Int. Cl.
G11B 21/08 (2006.01)
G11B 5/09 (2006.01)

(52) U.S. Cl.
USPC .................................... 369/30.06; 369/47.1

(58) Field of Classification Search
None
See application file for complete search history.

(56) References Cited

U.S. PATENT DOCUMENTS

| | | | |
|---|---|---|---|
| 5,559,776 A * | 9/1996 | Ikenaga ........................ | 369/47.1 |
| 5,687,161 A | 11/1997 | Owaki et al. | |
| 5,745,474 A | 4/1998 | Owaki et al. | |
| 5,748,585 A * | 5/1998 | Tsukamoto et al. ....... | 369/47.23 |
| 5,892,915 A | 4/1999 | Duso et al. | |
| 6,044,047 A * | 3/2000 | Kulas ......................... | 369/34.01 |
| 6,188,830 B1 | 2/2001 | Mercs et al. | |
| 6,269,382 B1 | 7/2001 | Cabrera et al. | |
| 6,477,123 B1 * | 11/2002 | Hutter ........................ | 369/47.32 |
| 2002/0069280 A1 | 6/2002 | Bolik et al. | |
| 2003/0115409 A1 | 6/2003 | Yamada et al. | |
| 2004/0193425 A1 * | 9/2004 | Tomes ......................... | 704/273 |

FOREIGN PATENT DOCUMENTS

| | | |
|---|---|---|
| EP | 0 942 419 | 9/1999 |
| EP | 1 103 967 | 5/2001 |
| GB | 2 317 986 | 4/1998 |
| JP | 4-258866 A | 9/1992 |
| JP | 4-258867 A | 9/1992 |
| JP | 7-193774 A | 7/1995 |
| JP | 8-050756 A | 2/1996 |
| JP | 8-249795 A | 9/1996 |
| JP | 9-055072 A | 2/1997 |
| JP | 9-134586 A | 5/1997 |
| JP | 9-161461 A | 6/1997 |
| JP | 10-125048 A | 5/1998 |
| JP | 11-134844 A | 5/1999 |
| JP | 11-232038 A | 8/1999 |
| JP | 11-328824 A | 11/1999 |

(Continued)

*Primary Examiner* — Joseph Haley
*Assistant Examiner* — Carl Adams
(74) *Attorney, Agent, or Firm* — Lerner, David, Littenberg, Krumholz & Mentlik, LLP

(57) ABSTRACT

A readout device includes a first recording medium having recorded therein data of arbitrary plural portions of a period of a predetermined length in temporally continuous content; a second recording medium having recorded therein data of the entire content; and a readout control unit that controls, when the readout of data of the content is requested, the readout of data from the first recording medium and from the second recording medium such that data of any one of the portions recorded in the first recording medium is read out and data following the data read out from the first recording medium is read out from the second recording medium.

11 Claims, 21 Drawing Sheets

(56) References Cited

FOREIGN PATENT DOCUMENTS

| | | |
|---|---|---|
| JP | 2000-011543 A | 1/2000 |
| JP | 2000-030417 A | 1/2000 |
| JP | 2000-040292 A | 2/2000 |
| JP | 2000-040348 A | 2/2000 |
| JP | 2000-076800 A | 3/2000 |
| JP | 2000-113646 A | 4/2000 |
| JP | 2000-195239 A | 7/2000 |
| JP | 2000-293924 A | 10/2000 |
| JP | 2001-076469 A | 3/2001 |
| JP | 2001-076470 A | 3/2001 |
| JP | 2001-076471 A | 3/2001 |
| JP | 2001148157 | 5/2001 |
| JP | 2001-155412 A | 6/2001 |
| JP | 2001-155471 A | 6/2001 |
| JP | 2001-344896 A | 12/2001 |
| JP | 2001-344949 A | 12/2001 |
| JP | 2002-039126 A | 2/2002 |
| JP | 2002150683 | 5/2002 |
| JP | 2002-247519 A | 8/2002 |
| JP | 2002-343027 A | 11/2002 |
| JP | 2003-030969 A | 1/2003 |
| JP | 2003141814 | 5/2003 |
| JP | 2004095015 | 3/2004 |
| JP | 2004241104 | 8/2004 |
| JP | 2004-282562 A | 10/2004 |

* cited by examiner

FIG. 5

| CONTENT DATABASE | INFORMATION ON FILE RELATED TO CONTENT |
| --- | --- |
| | DETAILS OF CONTENT, ADDITIONAL INFORMATION |
| | COMPRESSION FORM, REPRODUCTION TIME, INDEX INFORMATION OF CONTENT |
| | USER INFORMATION OF USER WHO CAN ACCESS CONTENT |
| STORE DATABASE | ASSOCIATION OF CACHE FILE NAME AND CACHE FILE ID |
| | CACHE FILE DATE INFORMATION (TIME WHEN CONTENT WAS WRITTEN, TIME WHEN CONTENT WAS ACCESSED LAST) |
| | MANAGEMENT OF VOLUME IDS OF OPTICAL DISKS IN WHICH ENTIRE DATA ARE STORED |
| | FREE CAPACITIES OF RESPECTIVE OPTICAL DISKS IN JUKE BOX |
| VOLUME DATABASE | RECORDING CAPACITIES IN STATE OF RAW DISK OF RESPECTIVE OPTICAL DISKS |
| | TYPES OF MEDIA AND ATTRIBUTES (READ ONLY/READ WRITE) OF RESPECTIVE OPTICAL DISKS |
| | VOLUME IDS OF OPTICAL DISKS STORED IN RESPECTIVE DISK SLOTS IN JUKEBOX |
| | STATE OF USE OF DRIVE MOUNTED ON JUKEBOX |
| EXTENDED ATTRIBUTES | AREA INFORMATION (OFFSET/SIZE/FLAG) |
| | HINT INFORMATION (HINT OFFSET/HINT SIZE/REGION FLAG/HINT PRIORITY) |
| | CACHE FILE ID |
| FILE ATTRIBUTE | READ ONLY/READ-WRITABLE |

READOUT DEVICE, READOUT METHOD, PROGRAM, AND PROGRAM RECORDING MEDIUM

CROSS-REFERENCE TO RELATED APPLICATIONS

The present application claims priority from Japanese Patent Application No. JP 2005-189815 filed on Jun. 29, 2005, the disclosure of which is hereby incorporated by reference herein.

BACKGROUND OF THE INVENTION

1. Field of the Invention

The present invention relates to a readout device, a readout method, a program, and a program recording medium, and, more particularly to a readout device and a readout method for reading out content, a program, and a program recording medium.

2. Description of the Related Art

There is a recording and reproducing system that makes it possible to easily handle a large quantity of contents by recording data of the contents in plural recording media and automating mounting of the recording media in a drive.

FIG. 1 is a block diagram showing a structure of a recording and reproducing system in the past. A video/audio encoder 11 encodes, according to the Moving Pictures Experts Group (MPEG) system, image data of a baseband corresponding to an input image signal inputted. The video/audio encoder 11 encodes, according to the MPEG system, sound data of a baseband corresponding to a sound signal inputted (not shown). The video/audio encoder 11 supplies data obtained by the encoding to a stream encoder 12.

The stream encoder 12 multiplexes the encoded data supplied from the video/audio encoder 11, converts the multiplexed data into a stream of the MPEG transport stream system or the MPEG program stream system, and supplies the stream obtained by the conversion to a write buffer 13.

The write buffer 13 temporarily stores the stream (data) supplied from the stream encoder 12 and supplies the stream (the data) stored therein to a drive 14.

The drive 14 records the data supplied from the write buffer 13 in an optical disk 15 mounted therein as a file.

A juke system 16 controls mounting of the optical disk 15 in the drive 14 and unmounting of the optical disk 15 from the drive 14. The juke system 16 causes a picker 18 to select any one of plural disks 15 from disk slots 17 that store the respective optical disks 15. The picker 18 conveys the optical disk 15 selected and mounts the optical disk 15 in the drive 14 under the control by the juke system 16. The picker 18 also conveys the optical disk 15 unmounted from the drive 14 and stores the optical disk 15 in any one of the disk slots 17 under the control by the juke system 16. In other words, the juke system 16 controls the picker 18.

The drive 14 reads out the data recorded as the file from the optical disk 15 mounted therein and supplies the data read out to a read buffer 19. The read buffer 19 includes a semiconductor memory or a hard disk and temporarily stores the data (a stream) supplied from the drive 14. The read buffer 19 absorbs a readout jitter, planarizes a data rate to be fixed, and supplies the data (the stream) stored therein to a stream decoder 20.

The stream decoder 20 separates the stream of the MPEG transport stream system or the MPEG program stream system into image data and sound data and supplies the image data and the sound data separated to a video/audio decoder 21.

The video/audio decoder 21 decodes the image data and the sound data encoded into image data and sound data of a so-called baseband. The video/audio decoder 21 supplies an output image signal and sound signal (not shown), which are based on the image data and the sound data of the baseband obtained by the decoding, to a monitor 22. The monitor 22 displays an image on the basis of the output image signal and outputs sound on the basis of the sound signal supplied.

Processing of reproduction will be explained with reference to FIG. 2. When reproduction is requested from a user at time $t_0$, the optical disk 15 having stored therein data of content requested to be reproduced is conveyed from the disk slot 17 to the drive 14 and mounted in the drive 14 by the picker 18 at time $t_1$.

At time $t_2$, data recorded in the optical disk 15 mounted is started to be read out and stored in the read buffer 19 by the drive 14. When data having a predetermined data amount is accumulated in the read buffer 19 at time $t_3$, the data stored in the read buffer 19 is read out to the stream decoder 20. The video/audio decoder 21 decodes the image data and the sound data and supplies an output image signal and sound signal corresponding to image data and sound data obtained by the decoding to the monitor 22. At time $t_4$, the monitor 22 displays an image and outputs sound on the basis of the output image signal and sound signal.

From time $t_0$ when the reproduction is requested by the user until time $t_4$ when the image is displayed on the monitor 22, a time lag equivalent to time necessary for mounting the optical disk 15, which is stored in the disk slot 17, in the drive 14 and reading out the image data from the optical disk 15 mounted occurs. This time lag is about twenty seconds to thirty seconds depending on a structure of the recording and reproducing system.

This time lag occurs every time reproduction is requested. Thus, the user feels extremely heavy stress because of the time lag. This is a significant problem in terms of operability.

In the past, there is a video recording and reproducing apparatus including recording and reproducing means for recording a video and/or sound signal in a first recording medium or reproducing the video or sound signal from the first recording medium, a second recording medium that has a short access time compared with the first recording medium and in which, when a desired video and/or sound signal is recorded in the first recording medium or reproduced from the first recording medium, a signal from a starting part of the video and/or sound signal to a predetermined time is recorded or reproduced, and controlling means for controlling the recording and reproducing means and the second recording medium (see, for example, JP-A-9-161461).

However, the same time lag occurs when reproduction of content is started from the middle of the content. Thus, it is desirable to make it possible to reduce occurrence of a waiting time in reading out an arbitrary portion of the content.

SUMMARY OF THE INVENTION

According to an embodiment of the invention, there is provided a readout device including a first recording medium having recorded therein data of arbitrary plural portions of a period of a predetermined length in temporally continuous content; a second recording medium having recorded therein data of the entire content; and readout controlling means for controlling, when the readout of data of the content is requested, the readout of data from the first recording medium and from the second recording medium such that data of any one of the portions recorded in the first recording medium is read out and data following the data read out from the first recording medium is read out from the second recording medium.

In this embodiment, data of arbitrary plural portions, which are portions of a period of a predetermined length in temporally continuous content, is recorded in the first recording medium, data of the entire content is recorded in the second recording medium, and, when the readout of the data of the content is requested, the readout of the data from the first recording medium and from the second recording medium is controlled such that data of any one of the portions recorded in the first recording medium is read out and data following the data read out from the first recording medium is read out from the second recording medium.

Data of one entire content may be recorded in any one of plural second recording media. The readout device may further include readout means for reading out the data from the second recording medium; mounting means for mounting the second recording medium in the readout means; and mounting controlling means for controlling the mounting means, in a period in which data is read out from the first recording medium, to mount in the readout means, from among the plural second recording media, the second recording medium having recorded therein data following the data read out from the first recording medium.

The readout device may further include receiving means for receiving, according to an operation of a user, the designation of one portion at which the readout of data is started from among the plural portions in the first recording medium. The readout controlling means may control the readout of data from the first recording medium and from the second recording medium such that data of the designated portion recorded in the first recording medium is read out and data following the data read out from the first recording medium is read out from the second recording medium.

The readout controlling means may control the readout of data from the second recording medium such that data following the data read out from the first recording medium, which is data not recorded in the first recording medium, is read out from the second recording medium.

The readout controlling means may control the readout of data from the second recording medium such that the data is read out at a high readout speed compared with a normal readout.

The readout controlling means may control the readout of data from the first recording medium such that data read out from the second recording medium, which follows the data of portions recorded in the first recording medium in advance, is recorded in the first recording medium following the data of the respective portions and, then, data of a portion and data following the data of the portion are read out from the first recording medium.

The readout controlling means may record in the first recording medium data read out from the second recording medium which is not recorded in the first recording medium in advance.

The readout controlling means may record data of the entire content in the first recording medium on the basis of data read out from the second recording medium when the readout of data of the content is requested.

As described above, according to an embodiment of the invention, it is possible to reduce the occurrence of a waiting time in reading out an arbitrary portion of the content.

BRIEF DESCRIPTION OF THE DRAWINGS

FIG. 5 is a table for explaining information used in the recording and reproducing system;

DETAILED DESCRIPTION

Embodiments of the invention will be hereinafter explained in detail with reference to the accompanying drawings. An example of a correspondence relation between elements described in claims and specific examples in the embodiments of the invention is as described below. This description is made for the purpose of confirming that the specific examples supporting the inventions are described in the embodiments of the invention. Therefore, even if there is a specific example described in the embodiments of the invention but not described below as a specific example corresponding to an element, this does not mean that the specific example does not correspond to the element. On the other hand, even if a specific example is described as a specific example corresponding to an element, this does not means that the specific example does not correspond to elements other than the element.

Moreover, this description does not mean that the invention corresponding to a specific example described in the embodiments is described in all the claims. In other words, this description does not deny presence of an invention that corresponds to a specific example described in the embodiments and is not described in claims of this application, that is, presence of an invention that will be added by a divisional application or amendment.

Figure 4:
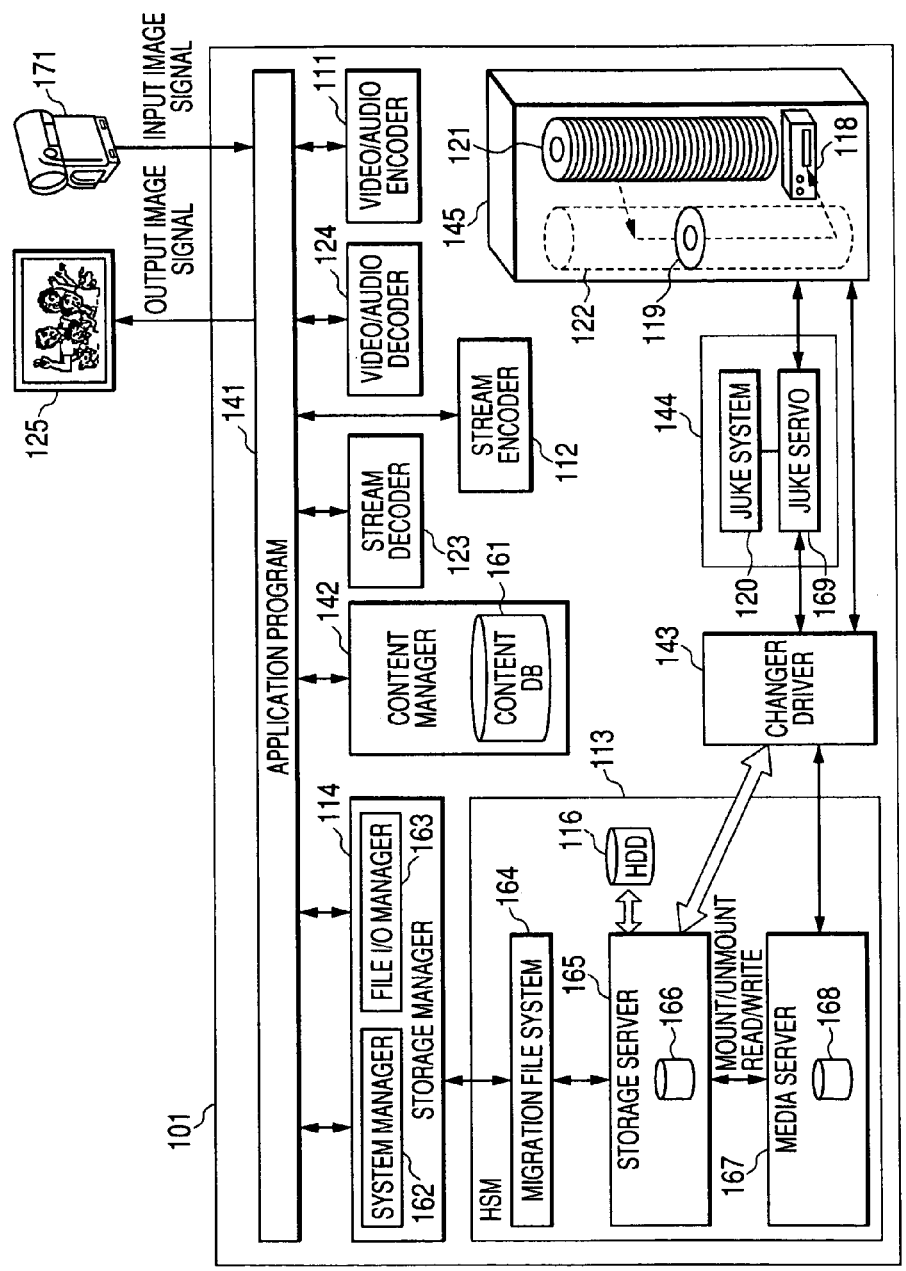
FIG. 4 is a block diagram showing a more detailed structure of the recording and reproducing system.

A readout device according to an embodiment of the invention includes: a first recording medium (e.g., a hard disk (HD) 116 shown in FIG. 4) having recorded therein data of arbitrary plural portions, which are portions of a period of a predetermined length in temporally continuous content; a second recording medium (e.g., an optical disk 119 shown in FIG. 4) having recorded therein data of the entire content; and readout controlling means (e.g., a hierarchical storage manager (HSM) 113) that controls, when readout of data of the content is requested, readout of data from the first recording medium and the second recording medium such that data of any one of the portions recorded in the first recording medium is read out and data following the data read out from the first recording medium is read out from the second recording medium.

A readout method according to another embodiment of the invention is a readout method for a readout device that reads out data from a first recording medium (e.g., the hard disk (HD) 116 shown in FIG. 4) having recorded therein data of arbitrary plural portions, which are portions of a period of a predetermined length in temporally continuous content, and a second recording medium (e.g., the optical disk 119 shown in FIG. 4) having recorded therein data of the entire content. The readout method includes: a first control step (e.g., step S124 in FIG. 20) of controlling, when readout of data of the content is requested, readout of data from the first recording medium such that data of any one of the portions recorded in the first recording medium is read out; and a second control step (step S129 in FIG. 20) of controlling readout of data from the second recording medium such that data following the data read out from the first recording medium is read out from the second recording medium.

Figure 1:
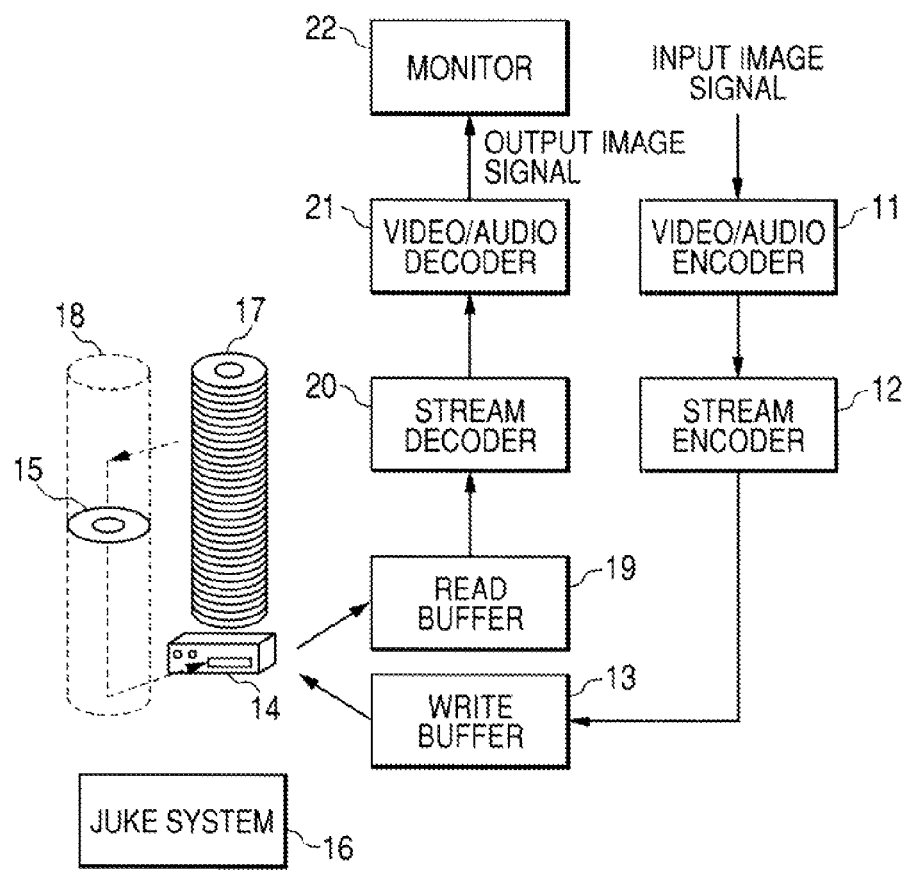
FIG. 1 is a block diagram showing a structure of a recording and reproducing system in the past.
Figure 2:
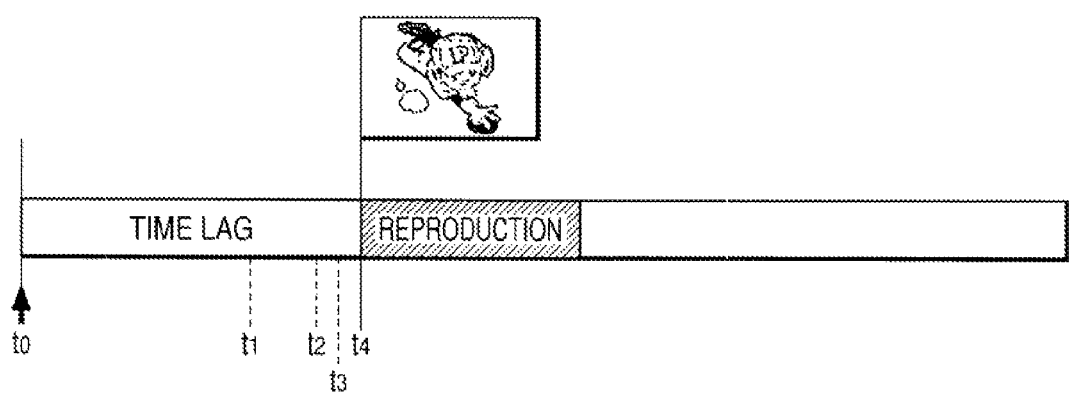
FIG. 2 is a diagram for explaining processing for reproduction in the past.
Figure 3:
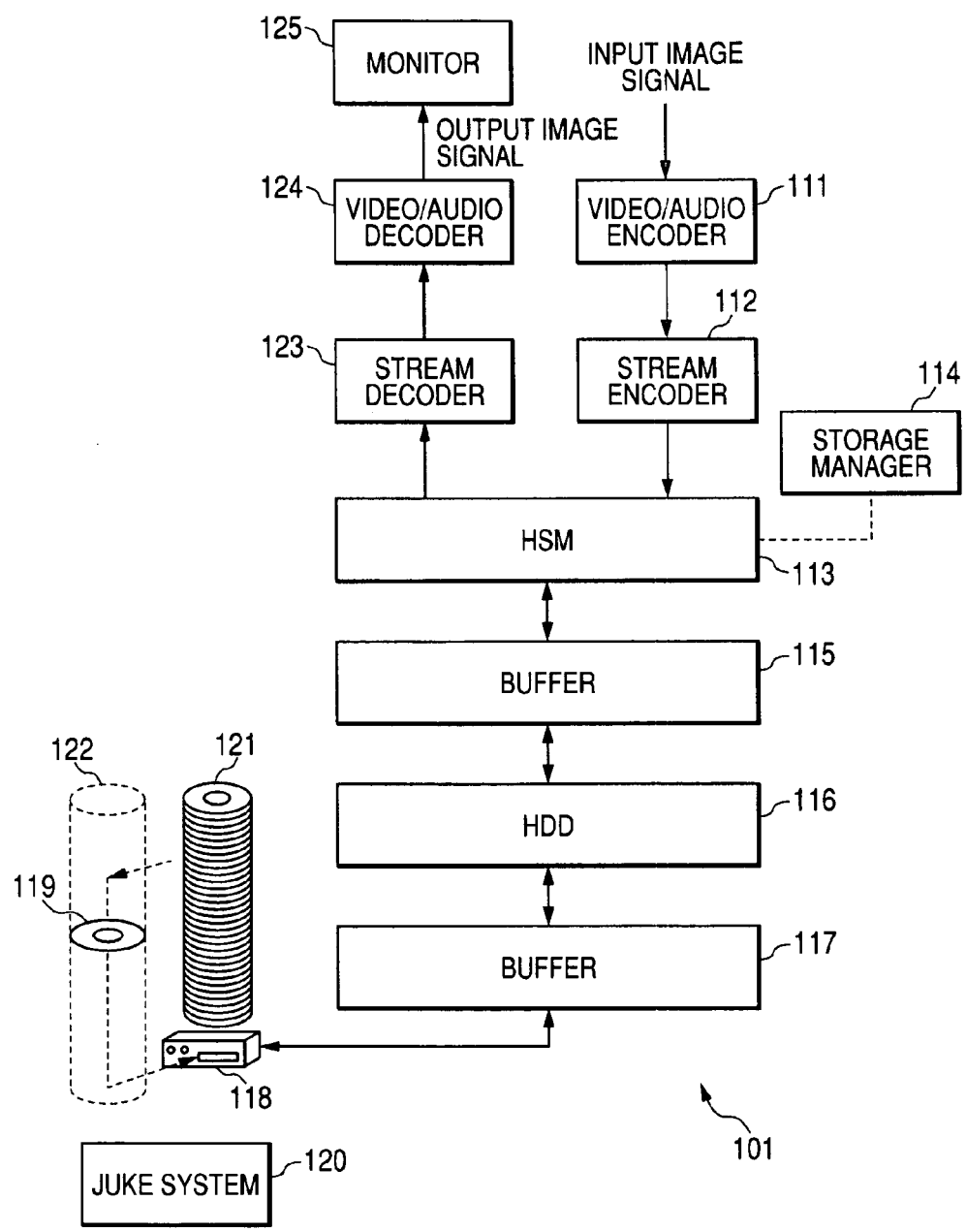
FIG. 3 is a block diagram showing a structure of a recording and reproducing system according to an embodiment of the invention.

FIG. 3 is a block diagram showing a structure of a recording and reproducing system 101 according to an embodiment of the invention. A video/audio encoder 111 encodes, according to the Moving Pictures Experts Group (MPEG) system, image data of a baseband corresponding to an input image signal inputted. The video/audio encoder 111 encodes, according to the MPEG system, sound data of a baseband corresponding to a sound signal inputted (not shown). The video/audio encoder 111 supplies data obtained by the encoding to a stream encoder 112.

The stream encoder 112 multiplexes the encoded data supplied from the video/audio encoder 111, converts the multiplexed data into a stream of the MPEG transport stream system or the MPEG program stream system, and supplies the stream obtained by the conversion to a hierarchical storage manager (HSM) 113.

The HSM 113 manages hierarchical recording of data of content in a recording medium (or manages recording of data of content in a recording medium having a hierarchical structure). The HSM 113 supplies the stream supplied from the stream encoder 112 to a hard disk (HD) 116 via a buffer 115 under the control by the storage manager 114. The HD 116 is an example of a fast primary storage. The HD 116 records the stream (data) supplied from the HSM 113 via the buffer 115 under the control by the HSM 113. The HD 116 supplies the stream (the data) recorded therein to the buffer 115 or a buffer 117.

The buffer 115 includes a recording area of a part of a semiconductor memory or the HD 116. The buffer 115 temporarily stores the stream (the data) supplied from the HSM 113 or the HD 116 and supplies the stream (the data) stored therein to the HSM 113 or the HD 116. The buffer 117 includes a recording area of a part of the semiconductor memory or the HD 116. The buffer 117 temporarily stores the stream (the data) supplied from the HD 116 or a drive 118 and supplies the stream (the data) stored therein to the HD 116 or the drive 118.

The buffer 115 and the buffer 117 absorb readout jitters and planarized a data rate to be fixed.

The drive 118 records the data supplied from the buffer 117 in an optical disk 119 mounted therein as a file. The optical disk 119 is an example of a slow secondary storage, for example, a magneto-optical disk (MO), a digital versatile disc (DVD), or a compact disc (CD).

A juke system 120 controls mounting of the optical disk 119 in the drive 118 and unmounting of the optical disk 119 from the drive 118. The juke system 120 causes a picker 122 to select any one of optical disks 119 from disk slots 121 storing the respective optical disks 119. The picker 122 conveys the optical disk 119 selected and mounts the optical disk 119 in the drive 118 under the control by the juke system 120. The picker 122 also conveys the optical disk 119 unmounted from the drive 118 and stores the optical disk 119 in any one of the disk slots 121 under the control by the juke system 120. In other words, the juke system 120 controls the picker 122.

The drive 118 reads out the data recorded as the file from the optical disk 119 mounted therein and supplies the data read out to the buffer 117. The data read out from the optical disk 119 is supplied to the HD 116 via the buffer 117 and recorded in the HD 116.

The HSM 113 reads out the data (the stream), which is read out from the optical disk 119 and recorded in the HD 116, from the HD 116 via the buffer 115 and supplies the data (the stream) read out to a stream decoder 123.

The stream decoder 123 separates the stream in the MPEG transport stream system or the MPEG program stream system into image data and sound data and supplies the image data and the sound data separated to a video/audio decoder 124.

The video/audio decoder 124 decodes the image data and the sound data encoded into image data and sound data of a so-called baseband. The video/audio decoder 124 supplies an output image signal and sound signal (not shown), which are based on the image data and the sound data of the baseband obtained by the decoding, to a monitor 125. The monitor 125 displays an image on the basis of the output image signal and outputs sound on the basis of the sound signal supplied.

In the video/audio encoder 111, in recording content, all data of the content corresponding to an input image signal inputted are recorded in the HD 116. In an idle time of the drive 118, all the data of the content recorded in the HD 116 are copied to the optical disk 119. In this case, the HSM 113 records, in a store database described later, information indicating which data of the content is written in which optical disk 119. As described in detail later, this information includes information for identifying a file in which data of content is stored, information for identifying the optical disk 119 in which all the data of the content are written, a date and time of the writing, or a name of the file in which the data of the content is stored.

A stream directly inputted from the outside may be recorded or the stream may be outputted. A system for encoding data is not limited to the MPEG and only has to be an encoding system for predetermined compression and expansion. Moreover, a system for the stream does not limit the invention.

FIG. 4 is a block diagram showing a more detailed structure of the recording and reproducing system 101. An application program 141 has a function of an interface with a user and acquires an instruction from the user or notifies the user of various kinds of information concerning the recording and reproducing system 101. The application program 141 controls the entire recording and reproducing system 101.

For example, the application program 141 controls the video/audio encoder 111, the stream encoder 112, the video/audio decoder 124, the stream decoder 123, a content manager 142, and the storage manager 114 according to operation by the user. The application program 141 acquires an input image signal and sound signal from a video camera 171 and supplies the input image signal and sound signal acquired to the video/audio encoder 111. The application program 141 acquires an output image signal and sound signal from the video/audio decoder 124 and supplies the output image signal and sound signal acquired to the monitor 125. Moreover, the application program 141 supplies a stream (data) supplied from the HSM 113 via the storage manager 114 to the stream decoder 123.

The content manager 142 manages details of content recorded in the recording and reproducing system 101 and searches for the details of the content. The content manager 142 controls recording of various kinds of information concerning the content in a content database (DB) 161 and controls readout of the information concerning the content from the content database 161.

As shown in FIG. 5, in the content database 161, information on a file related to the content (e.g., a file name and a pass name), details and additional information of the content (e.g., a name of the content and a genre of the content), a compression form (system), a reproduction time, and index information (e.g., a position of an index in the content) of the content, user information of a user who can access the content (e.g., a name of the user and a password), and the like are recorded as information on the content.

The storage manager 114 controls the HSM 113 from the highest hierarchy. In other words, the storage manager 114 controls the HSM 113 on the basis of a request from the application program 141. A system manager 162 and a file I/O manager 163 are provided in the storage manager 114.

The system manager 162 sets a system related to storage control, records a system log, manages an error log, and executes maintenance processing. The file I/O manager 163 receives a request for readout or writing of a file from the application program 141. The file I/O manager 163 instructs conversion of the file of the content recorded in the HD 116 into, for example, a stub file (state) that holds data of a designated part, which is a part of image content or music content, as stub data. The file I/O manager 163 instructs suspension or resumption of processing for readout of data from the optical disk 119 to the HD 116 (reload described later). Moreover, the file I/O manager 163 instructs suspension or resumption of processing for writing of data in the optical disk 119 from the HD 116.

The HSM 113 manages the HD 116, the drive 118, the optical disks 119, the juke system 120, the disk slots 121, and the picker 122 as a virtual storage and controls temporary recording of data of content by the HD 116. The HSM 113 includes a migration file system 164, a storage server 165, a store database (DB) 166, a media server 167, and a volume database (DB) 168.

The migration file system 164 manages extended attributes of a file managed by the HSM 113 and rewrites the extended attributes. The migration file system 164 manages an access event to the file managed by the HSM 113. The migration file system 164 controls processing for reading out data from the optical disks 119 to the HD 116 and controls processing for writing data in the optical disks 119 from the HD 116.

The storage server 165 reads out data from the optical disks 119 to the HD 116 or writes data in the optical disks 119 from the HD 116. The storage server 165 manages recording of information on a cache file, which is recorded in the HD 116 and stores data of content, in the store database 166 and manages readout of the information on the cache file from the store database 166. The storage server 165 manages the entire data of the content and link information between the data and the optical disks 119 in which the data is recorded.

The store database 166 records information on the cache file, which is recorded in the HD 116 and stores data of content.

As shown in FIG. 5, association of a cache file name recorded in the HD 116 and a cache file ID, which is a value for specifying a cache file, is stored in the store database 166. Cache file date information indicating time when the cache file was written or time when the cache file was accessed last and volume IDs for specifying the optical disks 119 in which the entire data is stored are recorded in the store database 166. Free capacities of the respective optical disks 119 in a jukebox 145 are recorded in the store database 166.

The media server 167 manages the optical disks 119 stored in the respective disk slots 121. The media server 167 requests a changer driver 143 to mount a designated optical disk 119 in the drive 118. The media server 167 requests the changer driver 143 to store (unmount) the optical disk 119 mounted in the drive 118 in the disk slot 121.

The volume database 168 provided in the media server 167 stores information related to the optical disks 119.

As shown in FIG. 5, recording capacities in a raw disk state of the respective optical disks 119, types (a magneto-optical disk (MO), a digital versatile disc (DVD)+R or DVD+RW, etc.) of the respective optical disks 119 as media, and attributes such as write-only, read-writable, and the like are recorded in the volume database 168. Volume IDs of the optical disks 119 stored in the respective disk slots 121 in the jukebox 145 and a state of use of the drive 118 mounted on the jukebox 145 are recorded in the volume database 168.

The changer driver 143 controls the drive 118 and has a function of an interface between a jukebox control unit 144 and the HSM 113.

The jukebox control unit 144 includes a juke system 120 and a juke servo 169. The juke system 120 controls a system including the drive 118, the optical disks 119, the juke system 120, the disk slots 121, and the picker 122. The juke servo 169 drives the jukebox 145.

The jukebox 145 includes the drive 118, the optical disks 119, the disk slots 121, and the picker 122.

The data recorded in the content database 161, the store database 166, and the volume database 168 may be recorded in one database.

As shown in FIG. 5, area information concerning portions of the content in a cache file, hint information indicating a hint on which portion of the content is recorded in the HD 116 as a cache file, and a cache file ID are recorded in the migration file system 164 as extended attributes of the content.

The extended attributes of the content may be recorded and read out by a file system of an operating system or may be recorded in the content database 161.

More specifically, the area information includes an offset indicating, for a portion of the content in the cache file, an offset value (byte) from the top of data of the content to the top of the portion, a size indicating a data amount of the portion of the content, and a flag indicating whether the portion of the content is stored or is in a hole state as described in detail later. The hint information includes a hint offset indicating which portion of the content is recorded in the HD 116 as a cache file and indicating an offset value (byte) from the top of the data of the content to the top of the portion, a hint size indicating a data amount of the portion of the content, a region flag indicating attributes of the portion as described in detail later, and a hint priority indicating a priority in migrating this portion.

Moreover, as shown in FIG. 5, information indicating whether the content is read-only or read-writable is recorded by the file system.

A cache file recorded in the HD 116 and readout of data of content that uses the cache file will be explained with reference to FIGS. 6 to 11.

Figure 6:
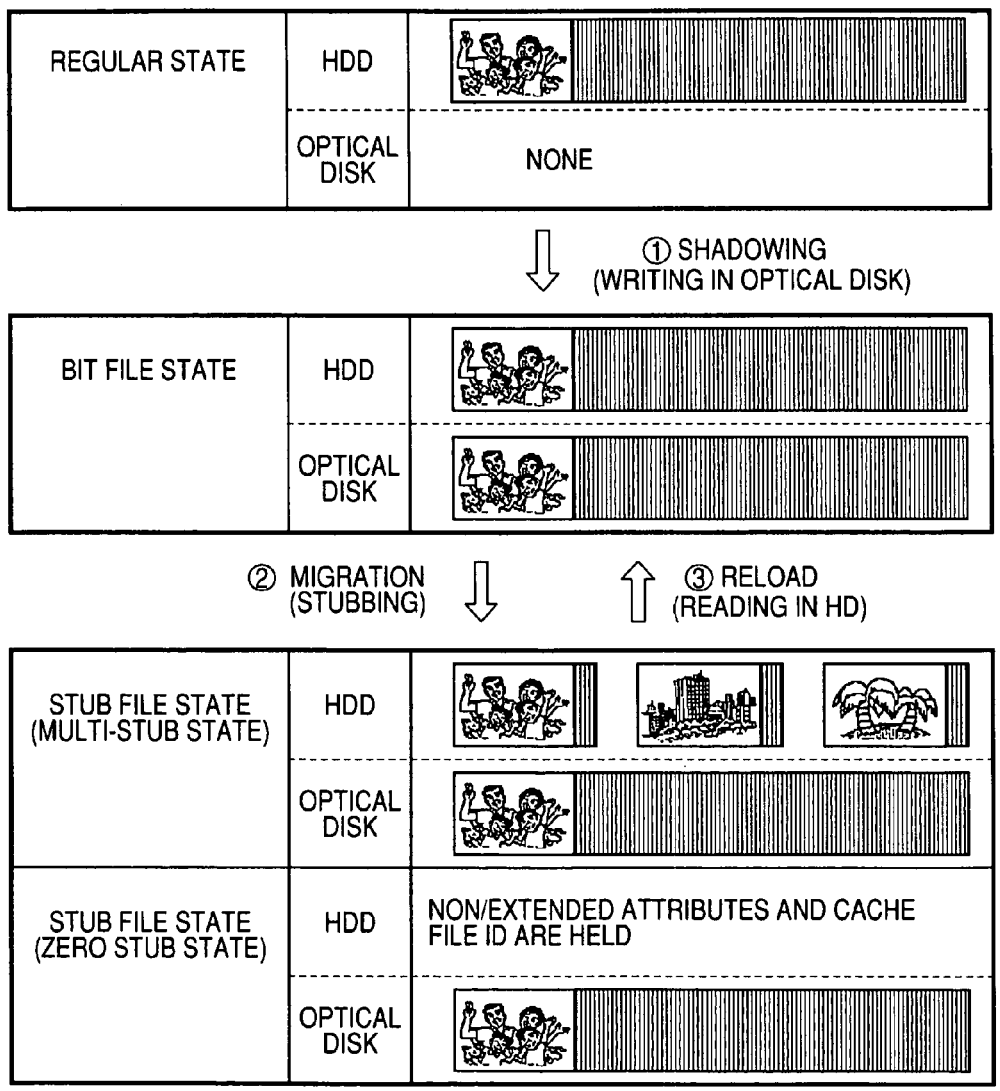
FIG. 6 is a diagram for explaining a cache file recorded in a hard disk (HD)

FIG. 6 is a diagram for explaining states of the cache file recorded in the HD 116. A stream (content) encoded by the video/audio encoder 111 and multiplexed by the stream encoder 112 is written in (a cache area) of the HD 116 as a cache file. A state of the cache file in which data of the entire stream (the entire content) inputted is recorded as shown in FIG. 6, is referred to as a regular state.

The entire content is recorded in the HD 116 and recorded in the optical disks 119 by shadowing for writing the cache file in the regular state recorded in the HD 116, which is executed in an idle time of the jukebox 145. A state of the cache file at the time when the data of the entire content is recorded in the HD 116 and recorded in the optical disks 119 is referred to as a bit file state.

When the cache file is in the regular state or the bit file state, in other words, when the entire stream, that is, the entire data of the content is recorded in the HD 116, the entire data of the content is read out from the HD 116. Thus, it is possible to read out the data of the content at high speed. However, when the cache file is in the regular state or the bit file state, since a data amount of the cache file is large, if the cache file in the regular state or the bit file state is recorded in the HD 116 for a large number of contents, an amount of consumption of recording areas of the HD 116 increases to instantly fill the HD 116 (comes into a state in which data is recorded in all the recording areas of the HD 116).

Thus, for example, it is possible to keep a total amount of data amounts of cache files recorded in the HD 116 within a fixed range by recording the data of the entire content in the optical disks 119 in order from an oldest cache file with reference to elapsed times since the cache files are recorded in the HD 116 and reducing the data amounts of the cache files recorded in the HD 116.

A state of the cache file in which the data of the entire content is not recorded but a predetermined portion of the data of the content is recorded as shown in FIG. 6 is referred to as a stub file state. In particular, a state of the cache file in which plural portions, which are predetermined portions, of the data of the content are stored is referred to as multi-stub state. A state in which the data of the entire content is eliminated from the cache file and only the extended attributes of the content and the cache file ID are recorded in the HD 116 is exceptionally referred to as a zero stub state.

Reading out the data of the content from the optical disks 119 in which the data of the entire content is recorded and recording the data read out in the HD 116 is referred to as reload. For example, it is possible to read out the data of the content from the optical disks 119 and record the data of the entire content in the HD 116.

Figure 7:
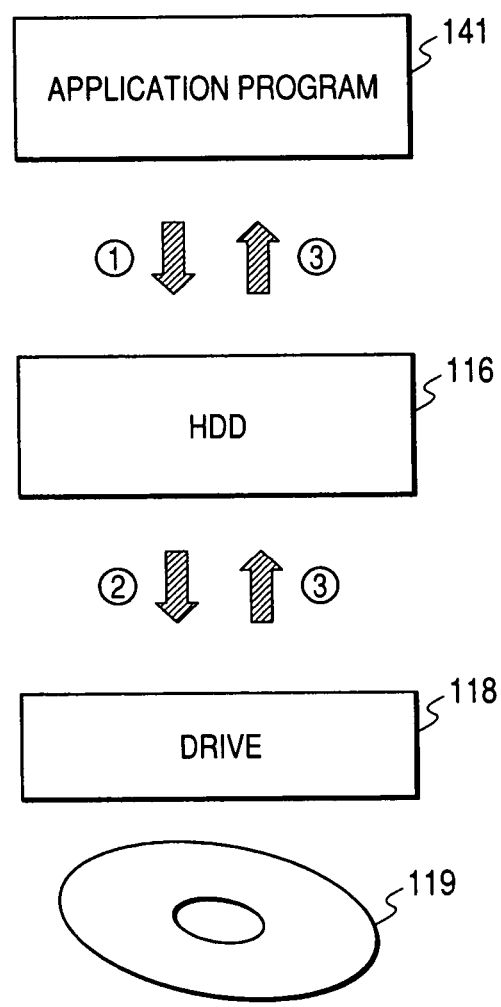
FIG. 7 is a diagram for explaining the cache file recorded in the HD and readout of data of content that uses the cache file.

As shown in FIG. 7, data corresponding to an input image signal and sound signal acquired from the application program 141 is recorded in the HD 116 and the data recorded in the HD 116 is recorded in the optical disk 119 mounted in the drive 118. In reading out this data, the data is read out from the HD 116 or read out from the optical disk 119 mounted in the drive 118 by the drive 118. The data read out from the optical disk 119 by the drive 118 is temporarily recorded in the HD 116 and read out to the application program 141 from the HD 116.

Figure 8:
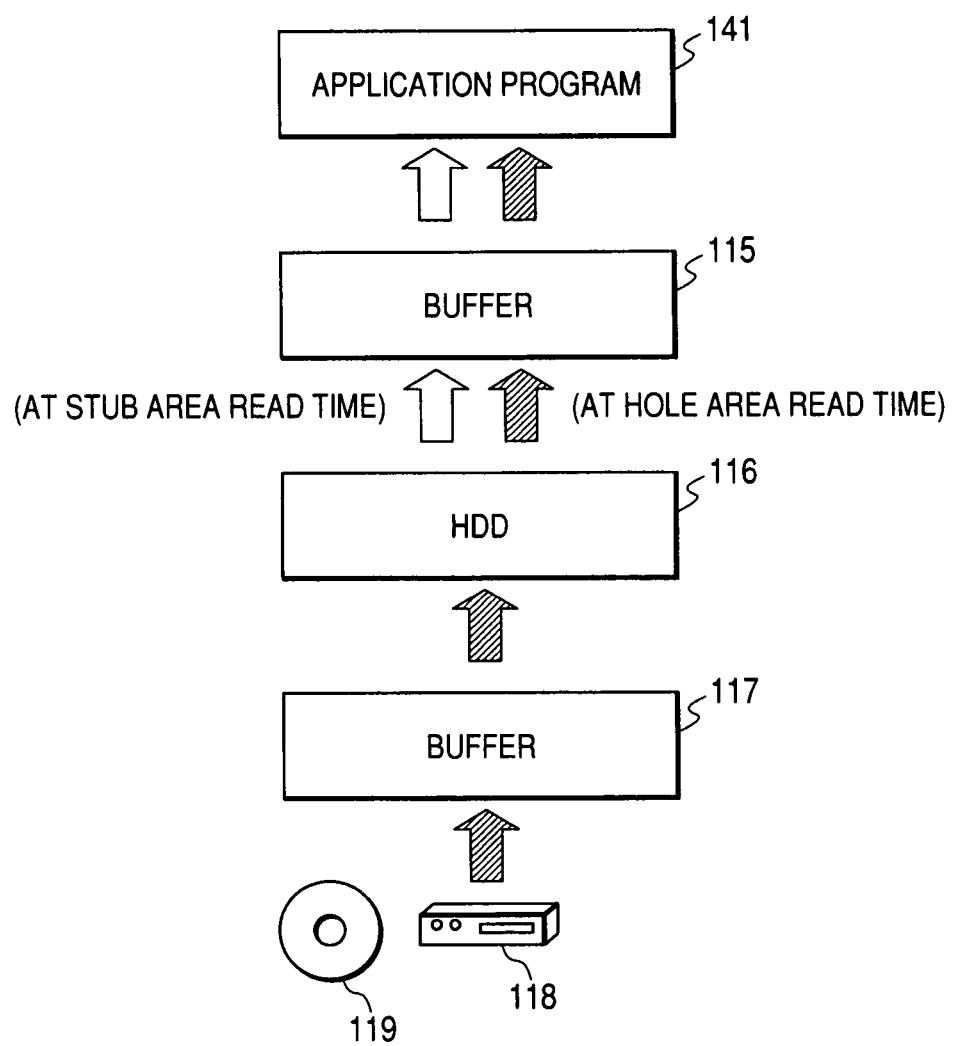
FIG. 8 is a diagram for explaining readout of the data of the content that uses the cache file.

More specifically, in reading out data, as shown in FIG. 8, the data is read out from the optical disk 119 mounted in the drive 118 by the drive 118 and temporarily stored in the buffer 117. The data temporarily stored in the buffer 117 is supplied to the HD 116 and recorded by the HD 116.

Data recorded in the HD 116 in advance (data in a stub area described later) is read out to the buffer 115 and temporarily stored in the buffer 115. Similarly, data read out from the optical disk 119 via the buffer 117 and recorded in the HD 116 in response to a request for reading out data (data in a hole area described later) is also read out to the buffer 115 and temporarily stored in the buffer 115.

The application program 141 reads out the data temporarily stored in the buffer 115 and outputs an output image signal and sound signal.

Figure 9:
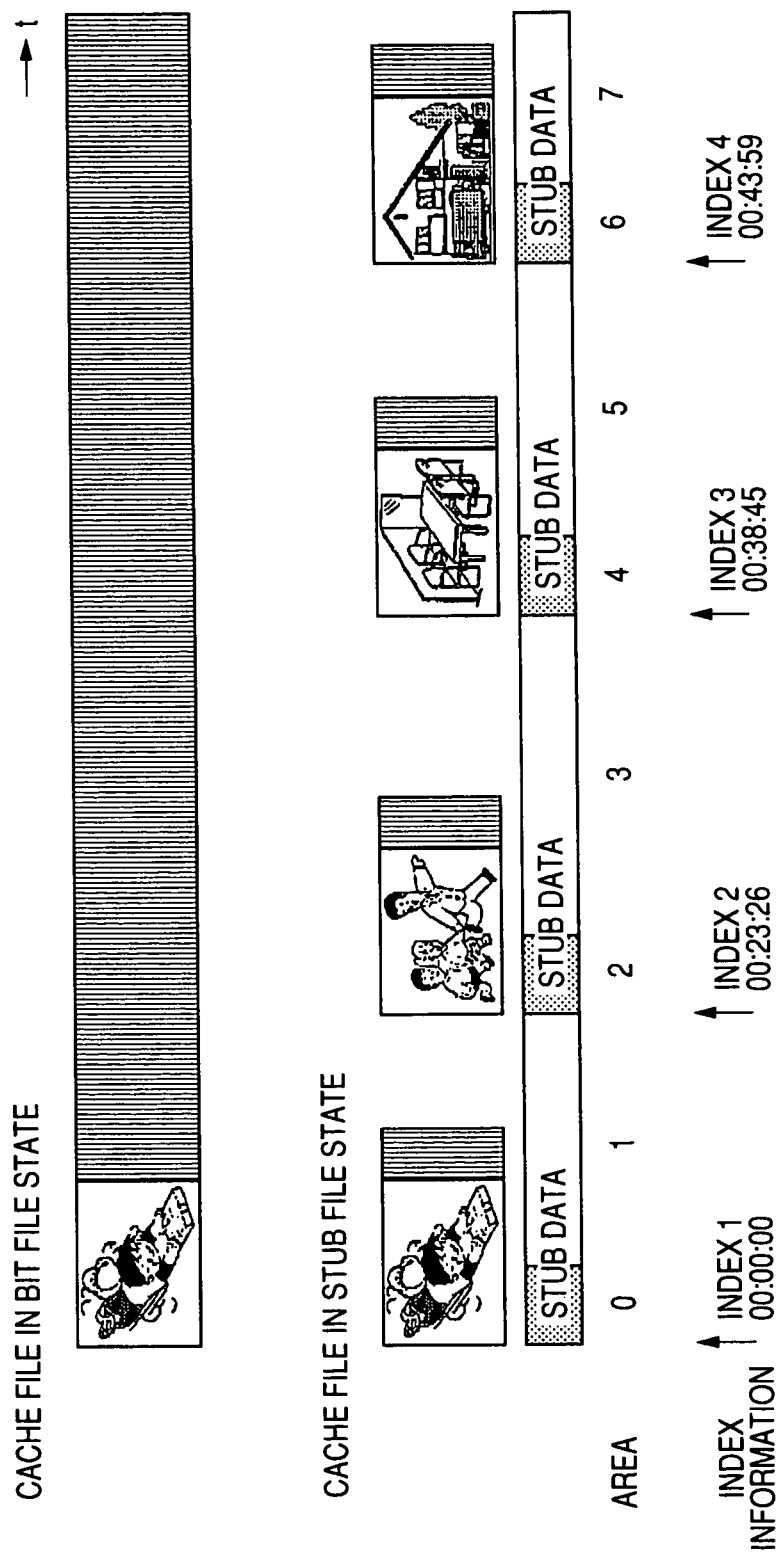
FIG. 9 is a diagram for explaining a cache file in a stub state.

FIG. 9 is a diagram for explaining a cache file in a stub state. A cache file in the bit file state is shown in FIG. 9 for comparison. As shown in FIG. 9, data of entire content is stored in the cache file in the bit file state and data of portions of content is stored in the cache file in the stub state.

For example, data of portions of the content in positions corresponding to indexes indicated by index information are stored in the cache file in the stub state. Index information indicates an index 1 in a start position of the content, an index 2 in a position where twenty-three minutes and twenty-six seconds have elapsed from the start of the content, an index 3 in a position where thirty-eight minutes and forty-five seconds have elapsed from the start of the content, and an index 4 in a position where forty-three minutes fifty-nine seconds have elapsed from the start of the content. In this case, data of a portion of the content in a predetermined period in the start position of the content, data of a portion of the content in a predetermined period in the position where twenty-three minutes and twenty-six second have elapsed from the start of the content, data of a portion of the content in a predetermined period in the position where thirty-eight minutes and forty-five seconds have elapsed from the start of the content, and data of a portion of the content in a predetermined period in the position where forty-three minutes and fifty-nine seconds have elapsed from the start of the content are stored in the cache file as stub data.

Length of time of the content reproduced by the stub data is set longer than time necessary for unmounting the optical disk 119 stored in the disk slot 121 from the disk slot 121, mounting the optical disk in the drive 118, and reading out the data of the content from the optical disk 119 mounted in the drive 118. For example, the length of time is set to about twenty seconds to thirty seconds.

The stub means a portion of the content corresponding to the data recorded in the cache area of the HD 116 as a cache file. The stub area means an area on the content, stub data of which is recorded in the HD 116, that is, an area of the stub. The hole area is an area on the content, stub data of which is not recorded in the HD 116.

When the stub area and the hole area are not distinguished, the areas are simply referred to areas. In FIG. 9, data in an area that is a stub area indicated by 0 (stub data) corresponding to the index 1 is recorded in the HD 116 as a cache file. Data in an area that is a hole area indicated by 1 between the index 1 and the index 2 is not recorded in the HD 116. Similarly, data in an area that is a stub area indicated by 2 (stub data) corresponding to the index 2, data in an area that is a stub area indicated by 4 (stub data) corresponding to the index 3, and data in an area that is a stub area indicated by 6 (stub data) corresponding to the index 4 are recorded in the HD 116 as cache files. Data in an area that is a hole area indicated by 3 between the index 2 and the index 3, data in an area that is a hole area indicated by 5 between the index 3 and the index 4, and data in an area that is a hole area indicated by 7 behind the index 6 are not recorded in the HD 116.

Figure 10:
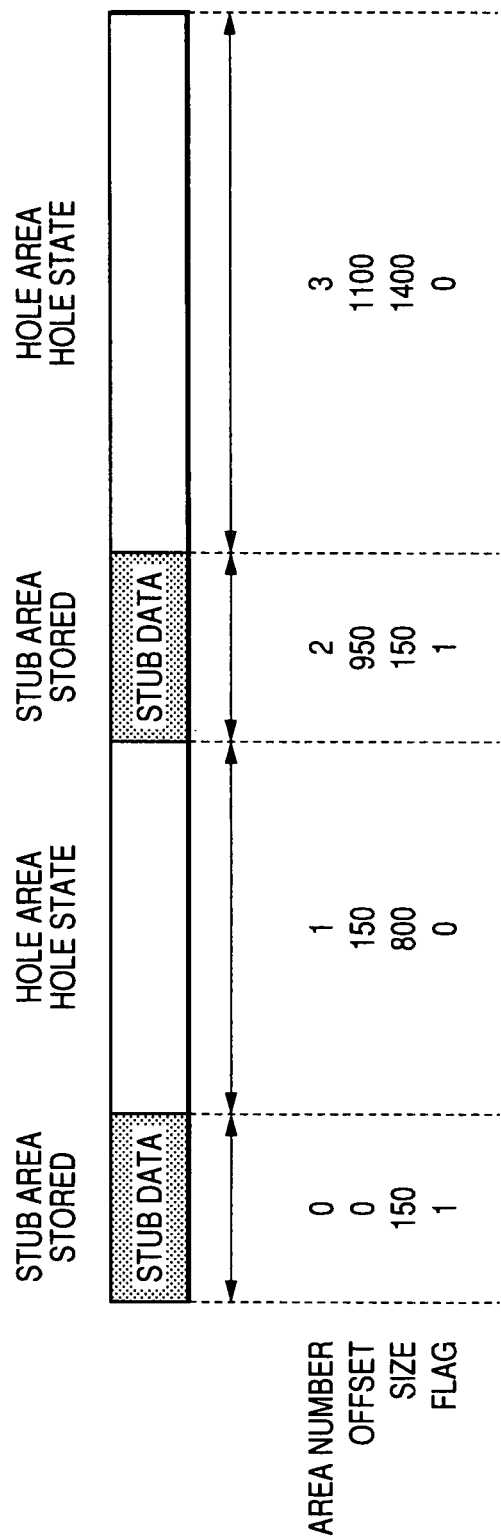
FIG. 10 is a diagram for explaining areas and area information in extended attributes.

Areas and area information in extended attributes will be explained with reference to FIG. 10. In an example shown in FIG. 10, a stub area is arranged at the top of data of content. A hole area is arranged to follow the stub area. A stub area is arranged to follow the hole area and a hole area is arranged to follow the stub area. In other words, stub data, which is data in a portion at the top of the content, is recorded in the cache file of the HD 116 (is set as stored) and data in an area following the portion of the top of the content, which is an area having a predetermined length, is not recorded in the cache file of the HD 116 (is brought into the hole state). Stub data, which is data in a predetermined portion of the content following the area in the hole state, is recorded in the cache file of the HD 116 (is set as stored) and data in an area following the portion, which is an area having a predetermined length, is not recorded in the cache file of the HD 116 (is brought into the hole state). In other words, an area in which data of a portion of the content is recorded in the cache file of the HD 116 and an area in which data of a portion of the content is not recorded in the cache file of the HD 116 are alternately arranged.

The area information includes an area number, an offset, a size, and a flag of each of the areas. The area number takes continuous values of 0 to N (an integer) from the top of the file. In other words, the area number is a serial number of an integer added to each of the areas in order from the top of the data of the content with 0 as an initial value. The offset indicates an offset value from the top of the file (the top of the data of the content) to the top of the area. The offset is, for example, in byte units. The size indicates a data amount of the data in the area. The size is, for example, in byte units. The flag indicates a stub area (stored) or a hole area (the hole state). For example, a flag of 1 indicates a stub area (stored) and a flag of 0 indicates a hole area (the hole state).

For example, a stub area at the top of the data of the content is located at the top of the data of the content and has a data amount of 150 bytes. Since this area is a stub area (in which data is stored), an area number 0, an offset 0, a size 150, and a flag 1 are affixed to the stub area at the top of the data of the content. Since an area second from the top of the data of the content has an original data amount of 800 bytes and is a hole area (the content is in the hole state), an area number 1, an offset 150, a size 800, and a flag 0 are affixed to this area.

Similarly, since an area third from the top of the data of the content has a data amount of 150 bytes and is a stub area (in which data is stored), an area number 2, an offset 950 (150+800), a size 150, and a flag 1 are affixed to this area. Since an area fourth from the top of the data of the content has an original data amount of 1400 bytes and is a hole area (the content is in the hole state), an area number 3, an offset 1100 (950+150), a size 1400, and a flag 0 are affixed to this area.

In this way, the area information in the extended attributes of the content indicates states of the respective areas in the cache file. It is possible to learn states of the areas in the cache file by referring to the area information.

Figure 11:
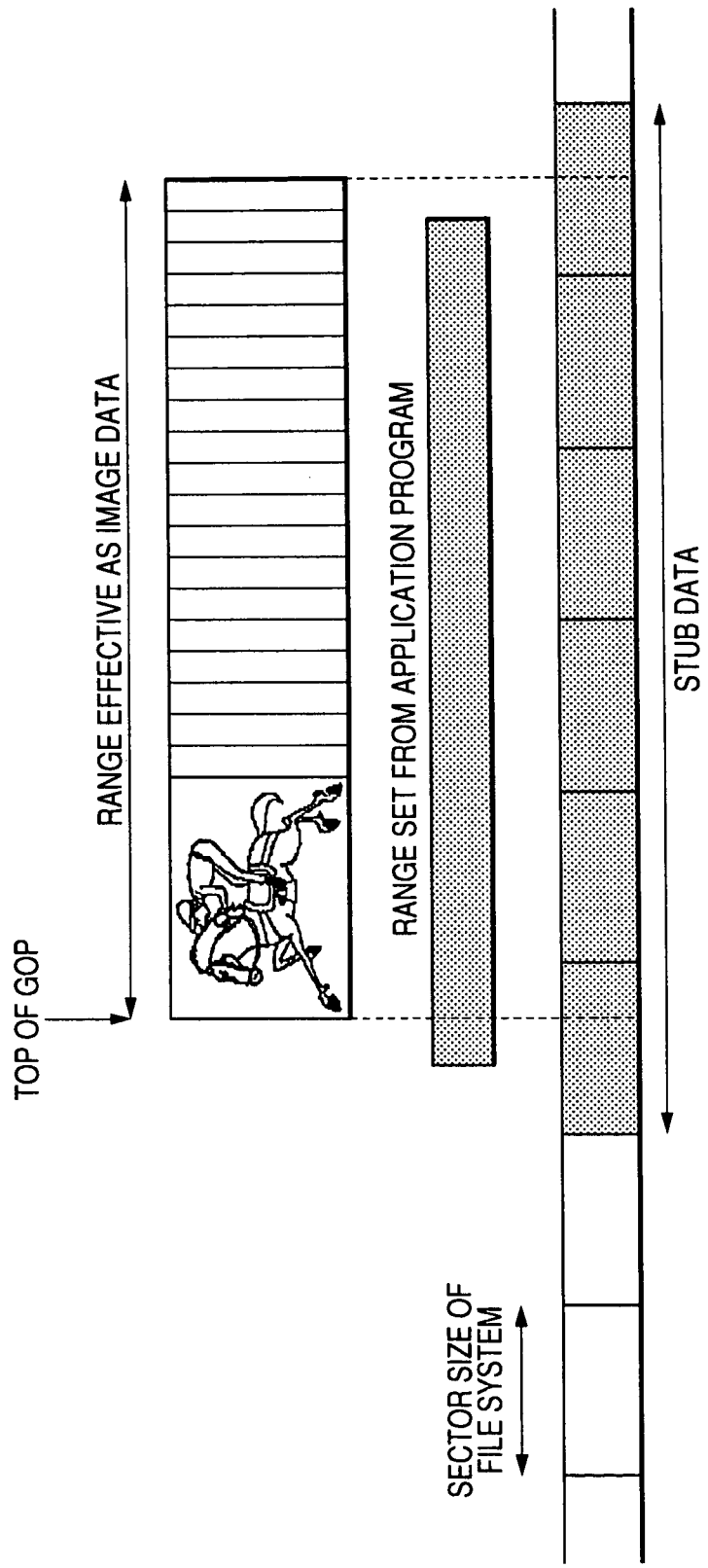
FIG. 11 is a diagram for explaining details of stub data.

FIG. 11 is a diagram for explaining details of the stub data recorded in the HD 116. In the file system of the operating system, data is recorded in the HD 116 with a sector size, which is a minimum unit of recording in the HD 116, as a reference. When data (a stream) of content is recorded in the HD 116, a boundary of sectors and a boundary of image data or sound data in the data (the stream) of the content (e.g., a boundary of units of encoding) do not always coincide with each other.

When the stub data is left in a cache file, data recorded in a sector in a range designated by the application program 141 is sliced as stub data. This stub data is generated to be sectioned in sector units.

When a portion in the middle of the data of the content is sliced as stub data, the top of the stub data and the top of the boundary of the stream do not coincide with each other in many cases. For example, when a compression system for the content is the MPEG2, a boundary of a group of pictures (GOP) does not always coincide with the top of the stub data.

In the recording and reproducing system 101, when content is reproduced, even when data, the top of which does not coincide with the top of a boundary of a stream, is read out by the HSM 113 and supplied to the stream decoder 123, the stream decoder 123 detects a boundary of a stream appearing first from the top of the stub data (e.g., the top of the GOP) and separates the data. Thus, the video/audio decoder 124 can correctly decode the data separated.

In other words, when stub data in a range designated by the application program 141 (a hint section described later) is left in the cache file or when the stub data is reloaded to the cache file, the HSM 113 records stub data necessary for reproducing the entire range designated in the HD 116. The HSM 113 also records stub data having a data amount an integer times as large as a recording capacity of a sector, which includes data of content necessary for reproducing the entire range designated, in the HD 116.

When stub data in a range designated by the application program 141 (a hint section described later) is erased (deleted) from the cache file, the HSM 113 erases the stub data, which is the data of the content necessary for reproducing the entire range, recorded in the HD 116 from the HD 116. Moreover, the HSM 113 erases the stub data having a data amount an integer times as large as a recording capacity of the sector, which includes the data of the content necessary for reproducing the entire range, recorded in the HD 116 from the HD 116.

In this way, when the stub data is left in the cache file or when the stub data is reloaded to the cache file, to record data of content necessary for reproducing an entire portion of a period of a predetermined length, the HSM 113 controls recording of the data of the content in the HD 116. To record data of content, which includes the data of the content necessary for reproducing the entire portion of the period of the predetermined length and has a data amount an integer times as large as a recording unit in the HD 116, the HSM 113 also controls recording of the data of the content in the HD 116.

When the stub data is erased (deleted) from the cache file, to erase the data of the content necessary for reproducing the entire portion recorded in the HD 116, the HSM 113 controls recording of the data of the content in the HD 116. To erase the data of the content, which includes the data of the content necessary for reproducing the entire portion of the period of the predetermined length and has a data amount an integer times as large as the recording unit in the HD 116, the HSM 113 also controls recording of the data of the content in the HD 116.

A sector size is 4 KB to 16 KB in Linux (trademark) and a data amount of data to be sliced is several tens MB. Thus, there is little influence due to a way of sectioning boundaries of sectors.

Figure 12:
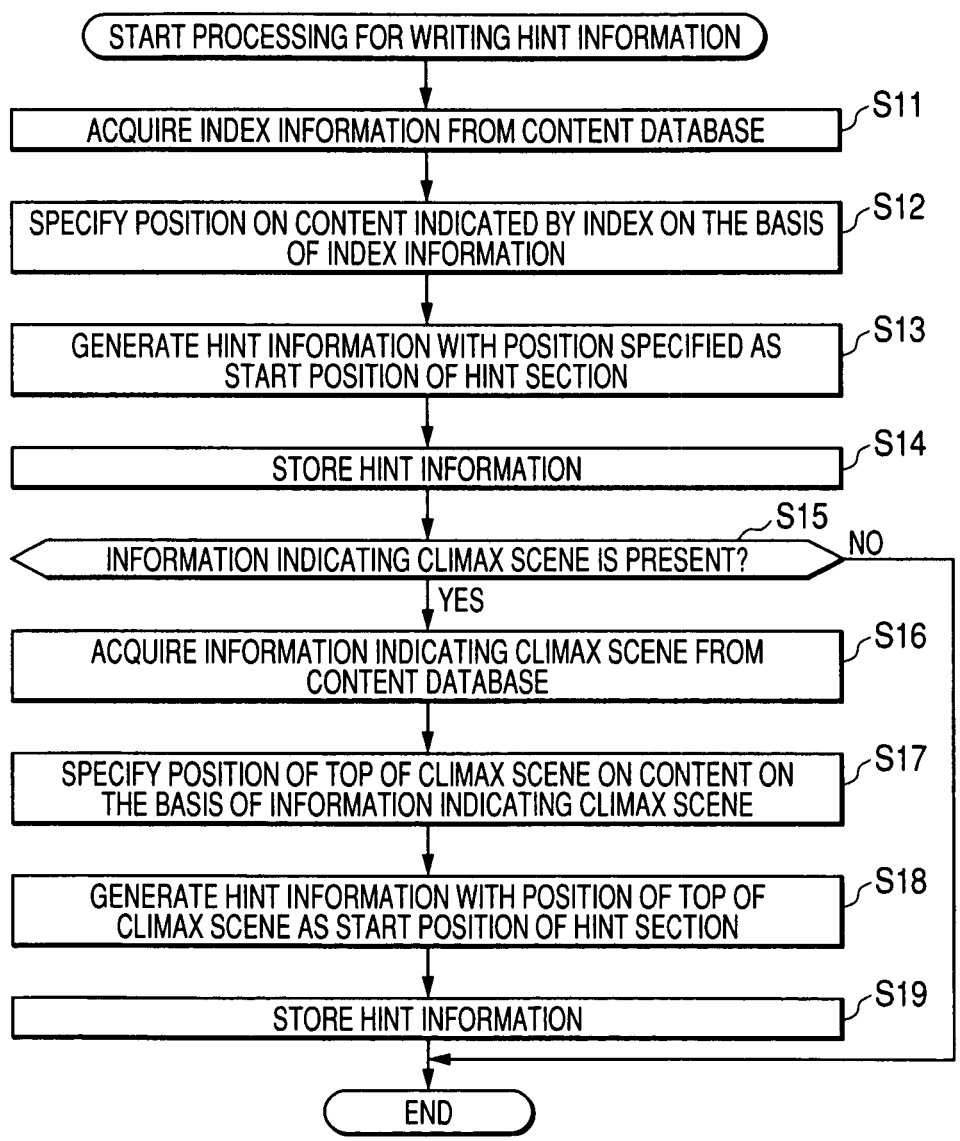
FIG. 12 is a flowchart for explaining processing for writing hint information.

Processing for writing hint information will be explained with reference to a flowchart in FIG. 12. In step S11, the application program 141 acquires index information indicating positions of indexes in content from the content database 161 via the content manager 142. In step S12, the application program 141 specifies positions on the content indicated by the indexes on the basis of the index information.

In step S13, the application program 141 generates hint information with the positions specified as start positions of hint sections. The hint sections are portions (ranges) in the content indicated by the hint information.

The hint information is information indicating a hint on which portion of content is recorded in the HD 116 as a cache file. It is possible to record data of arbitrary portions of the data of the content in a cache area of the HD 116 as stub data. In other words, data of a portions indicated by the hint information of the data of the content is stored in the cache file and recorded in the HD 116 as stub data. It is possible to execute stepwise processing of migration by referring to the hint information.

The hint information includes a version number, a hint section length, a hint offset, a hint size, a region flag, a hint priority, and a time stamp. One version number and one hint section length are arranged in one piece of hint information. A hint offset, a hint size, a region flag, a hint priority, and a time stamp corresponding to the number of hint sections are arranged in one piece of hint information. In other words, one set of a hint offset, a hint size, a region flag, a hint priority, and a time stamp indicates information on one area.

The version number indicates a version of hint information and is used for keeping compatibility of a system and software. The hint section length indicates a total of data amounts of all hint sections indicated by this hint information. When it is assumed that a data amount of one hint section is fixed, it is possible to calculate the number of hint sections by dividing the hint section length by the data amount of one hint section.

The hint offset indicates a start position of each of the hint sections as an offset from the top of the data of the content. For example, a unit of the hint offset is set as a data amount (byte, etc.). The hint size indicates a data amount of the hint section. A unit of the hint size is set as, for example, byte.

The region flag indicates, for each of the hint sections, an attribute concerning, for example, whether the hint section is a hint section corresponding to an index, a section corresponding to a climax scene, or a hint section corresponding to an important scene. The operating system or the like can generate an event according to an access with reference to the region flag.

The hint priority indicates a priority in migrating each of the hint sections. As a value of the hint priority is larger, data of a portion corresponding to the hint section is more easily migrated. When 0 is set in the hint priority, the data of the portion corresponding to the hint section is cached in the HD 116 serving as the primary storage until the content is deleted from the recording and reproducing system 101. It is possible to manage a value of the hint priority, for example, set 0 to a hint priority of a hint section corresponding to a portion (data) of the content frequently accessed, using the application program 141 or the operating system.

The time stamp indicates a date and time when the portion (the data) of the content corresponding to the hint section was accessed last. The time stamp is set by the application program 141 or the operating system.

For example, the application program 141 sets a predetermined value as the version number.

For example, the application program 141 calculates, from a position on the content that is time in reproduction of the content specified by the processing in step S12, a data amount from the top of the data of the content to the position. The application program 141 sets the data amount as a hint offset. For example, the application program 141 sets a predetermined value as a hint size. Moreover, for example, the application program 141 sets a predetermined value indicating correspondence to an index as a region flag.

Furthermore, the application program 141 sets a predetermined value as a hint priority. For example, the application program 141 sets a value that is 0 for a first index of the content and is 1 for the other indexes as a hint priority. The application program 141 sets a date and time when the data of the content was accessed last as a time stamp.

The application program 141 sets a value obtained by multiplying the number of hint sections by the hint size as a hint section length.

The application program 141 generates hint information by arranging, in a predetermined order, the version number, the hint section length, the hint offset, the hint size, the region flag, the hint priority, and the time stamp generated in this way.

In step S14, the application program 141 stores the hint information in the extended attributes of the content recorded in the migration file system 164 of the HSM 113 via the storage manager 114.

In step S15, the application program 141 judges whether there is information indicating a climax scene in the content database 161 on the basis of a result obtained by inquiring the content manager 142 about the information. When it is judged in step S15 that there is information indicating a climax scene, the application program 141 proceeds to step S16. The application program 141 acquires the information indicating the climax scene from the content database 161 via the content manager 142.

In step S17, the application program 141 specifies a position of the top of the climax scene on the content on the basis of the information indicating the climax scene. For example, the application program 141 specifies a position of the top of the climax scene, which depends on time in reproduction of the content, on the basis of the information indicating the climax scene.

In step S18, the application program 141 generates hint information with the position at the top of the climax scene as a start position of a hint section. In step S19, the application program 141 stores the hint information in the extended attributes of the content recorded in the migration file system 164 of the HSM 113 via the storage manager 114 to complete the processing.

When it is judged in step S15 that there is no information indicating a climax scene, the storage manager 114 skips the processing in steps S16 to S19 to complete the processing.

In this way, the hint information is generated on the basis of the index information and the information indicating the climax scene and recorded. By giving the hint information to the content (the data of the content), it is possible to cache data of arbitrary portions in the data of the content in the HD 116 as stub data and more quickly perform readout of the data of the content.

It is possible to perform stepwise processing of migration with reference to the hint information recorded in this way.

A value corresponding to operation by the user may be directly set in the hint information. The hint information may be written by other programs such as the operating system other than the application program 141.

Figure 13:
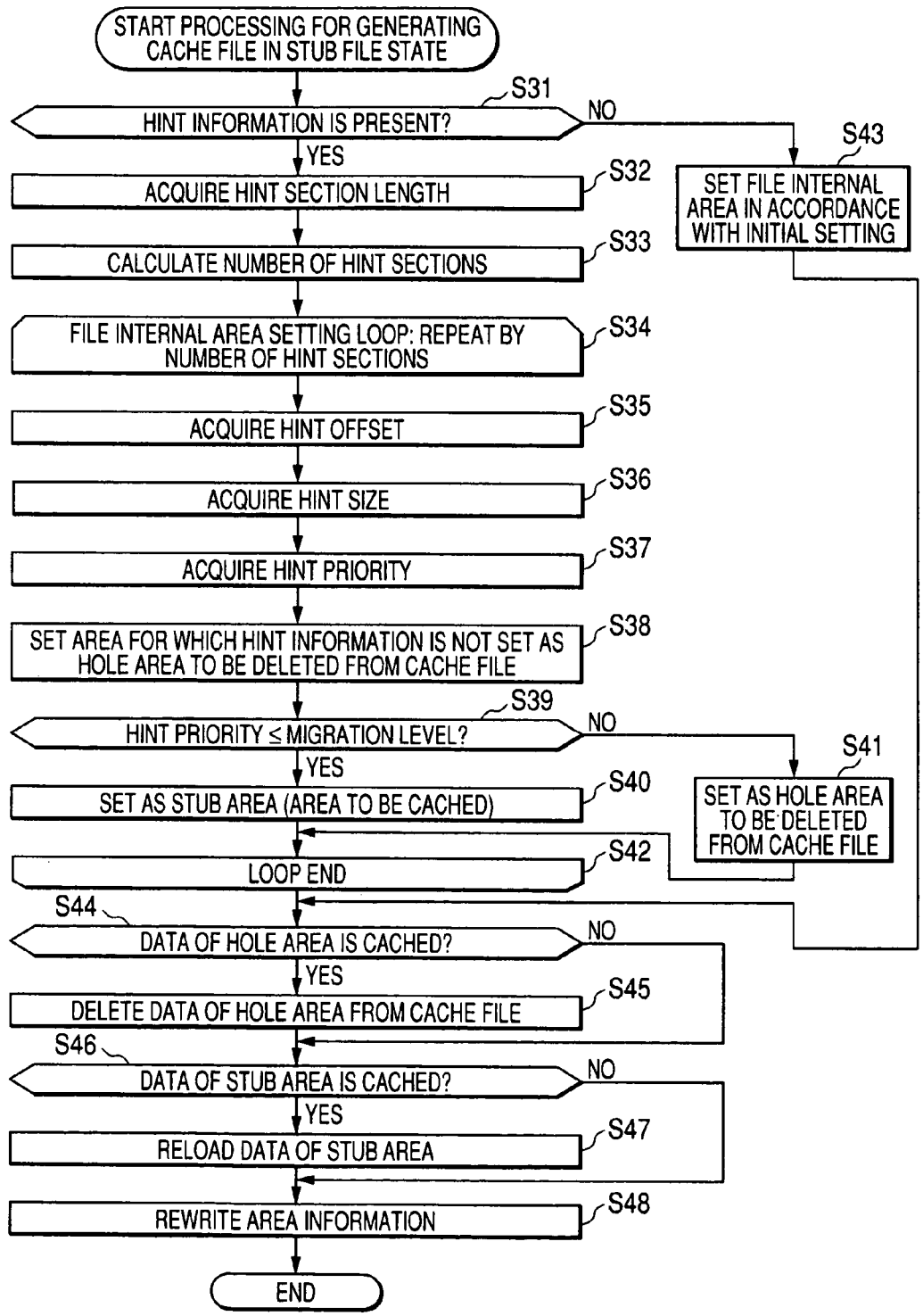
FIG. 13 is a flowchart for explaining processing for generating a cache file in a stub file state.

FIG. 13 is a flowchart for explaining processing for generating a cache file in a stub file state. In step S31, the storage manager 114 reads out the extended attributes of the content from the migration file system 164 of the HSM 113 and judges whether there is hint information in the extended attributes of the content. When it is judged in step S31 that there is hint information, the storage manager 114 proceeds to step S32. The storage manager 114 reads out the extended attributes of the content from the migration file system 164 of the HSM 113 and extracts the hint information from the extended attributes of the content read out. The storage manager 114 acquires a hint selection length indicating a total of data amounts of all hint sections in the hint information.

In step S33, the storage manager 114 calculates the number of hint sections by dividing the hint section length by a data amount of one hint section.

In steps S34 and S42, the storage manager 114 executes processing in steps S35 to S41 for the respective hint sections and executes processing for loop control to repeat the processing in steps S34 to S42 by the number of hint sections.

In step S35, the storage manager 114 acquires a hint offset indicating a start position of a predetermined hint section from the hint information. In step S36, the storage manager 114 acquires a hint size indicating a data amount of the hint section from the hint information. In step S37, the storage manager 114 acquires a hint priority indicating a priority of the hint section from the hint information.

In step S38, the storage manager 114 sets an area in which the hint information is not set as a hole area that is deleted from the cache file recorded in the HD 116.

In step S39, the storage manager 114 judges whether the hint priority is equal to or lower than a migration level set. When it is judged in step S39 that the hint priority is equal to or lower than the migration level set, the storage manager 114 proceeds to step S40. The storage manager 114 sets the hint section for which the hint priority is set as a stub area (an area to be cached).

The migration level is a reference for determining whether the hint section is cached. For example, the storage manager 114 stores a predetermined migration level or determines a migration level on the basis of a date and time when the content was accessed last included in the file attributes. The storage manager 114 may perform processing of judgment on the basis of a migration level supplied from the application program 141 according to operation by the user.

As explained with reference to FIG. 11, when data is stored in a file or data is read out from a file in recording units of a fixed length such as a sector by the file system or the like of the operating system, in step S40, the storage manager 114 sets an area including the hint section for which the hint priority is set as a stub area (an area to be cached).

On the other hand, when it is judged in step S39 that the hint priority is not equal to or lower than the migration level set, the storage manager 114 proceeds to step S41. The storage manager 114 sets a hint section for which the hint priority is set as a hole area that is deleted from the cache file.

In this case, as explained with reference to FIG. 11, when data is stored in a file or data is read out from a file in recording units of a fixed length such as a sector by the file system or the like of the operating system, in step S41, the storage manager 114 sets an area including the hint section for which the hint priority is set as a hole area.

The processing in steps S35 to S41 is executed for the respective hint sections. The areas including the respective hint sections are set as stub areas or set as hole areas. An area in which hint information is not set is set as a hole area.

After repeating the processing in steps S34 to S42 by the number of hint sections, the storage manager 114 proceeds to step S44.

When it is judged in step S31 that there is no hint information in the extended attributes of the content, the storage manager 114 proceeds to step S43. The storage manager 114 sets a file internal area in accordance with initial setting. In other words, in step S43, the storage manager 114 sets an area of the content as a stub area or a hole area in accordance with the initial setting and proceeds to step S44.

In step S44, the storage manager 114 judges whether data of a hole area is recorded in the cache file, that is, whether data of a hole area is cached. When it is judged that data of a hole area is cached, the storage manager 114 proceeds to step S45. The storage manager 114 causes the HSM 113 to delete (erase) the data of the hole area from the cache file. The HSM 113 erases the data of the hole area from the cache file of the HD 116 under the control by the storage manager 114. Thereafter, the storage manager 114 proceeds to step S46.

When it is judged in step S44 that the data of the hole area is not cached, it is unnecessary to execute processing for deleting data from the cache file. Thus, the processing in step S45 is skipped and the storage manager 114 proceeds to step S46.

In step S46, the storage manager 114 judges whether data of a stub area is recorded in the cache file, that is, whether data of a stub area is cached. When it is judged that data of a stub area is not cached, the storage manager 114 proceeds to step S47 and causes the HSM 113 to reload data of a stub area to the cache file. The HSM 113 mounts the optical disk 119 having data of the entire content stored therein in the drive 118 under the control by the storage manager 114. The HSM 113 causes the drive 118 to read out data of the content from the optical disk 119 and stores the data of the content read out in the cache file of the HD 116 to thereby reload the data of the stub area. Thereafter, the storage manager 114 proceeds to step S48.

When it is judged in step S46 that data of a stub area is cached, it is unnecessary to execute processing of reloading data of a stub area. Thus, the storage manager 114 skips the processing in step S47 and proceeds to step S48.

In step S48, the storage manager 114 causes the migration file system 164 of the HSM 113 to rewrite area information of the extended attributes of the content to be associated with a result of the erasure of the data from the cache file or the reload of the data to the cache file to complete the processing.

As described above, the cache file in the stub file state is generated.

In this way, it is possible to execute the stepwise processing of migration on the basis of hint priorities.

By adding a hint priority of a desired value to a hint section and applying processing for generating a cache file in the stub file state, which is based on a migration level of a desired value, to a cache file, it is possible to easily and flexibly select a portion to be cached among the data of the content.

For example, it is possible to increase speed of readout processing by allocating an optimum storage area according to a type of content. For example, when the type of the content is image content or music content, for example, it is possible to reduce an amount of use of a recording area of the primary storage traded at a high price per recording capacity such as the HD 116 by arranging stub areas according to indexes of the content. Time during which the stub areas are accessed conceals time during which data of the entire content is reloaded to the primary storage. Thus, the user is not kept waiting for a long time from time when the user instructs access to the content until time when output is started. It is possible to provide the user with the content without causing the user to feel stress due to waiting.

As explained with reference to FIG. 12, hint information corresponding to index information (chapter information) is generated, hint information corresponding to climax scenes is generated, and stub data is recorded in a cache file on the basis of the hint information. In this case, in the application program 141, if the user can instruct reproduction of the indexes or the climax scenes easier than the other portions of the content, or if the user is guided to access the indexes or the climax scenes, it is possible to more surely output the content promptly without causing the user to wait for a long time.

The content is not limited to the image content and the music content. Content such as a game may be recorded. In this case, a specific data file or a portion of data of the content such as a game is recorded in the HD 116.

Processing for reading out the data of the content, which uses the cache file in the stub file state generated in this way, will be explained.

Figure 14:
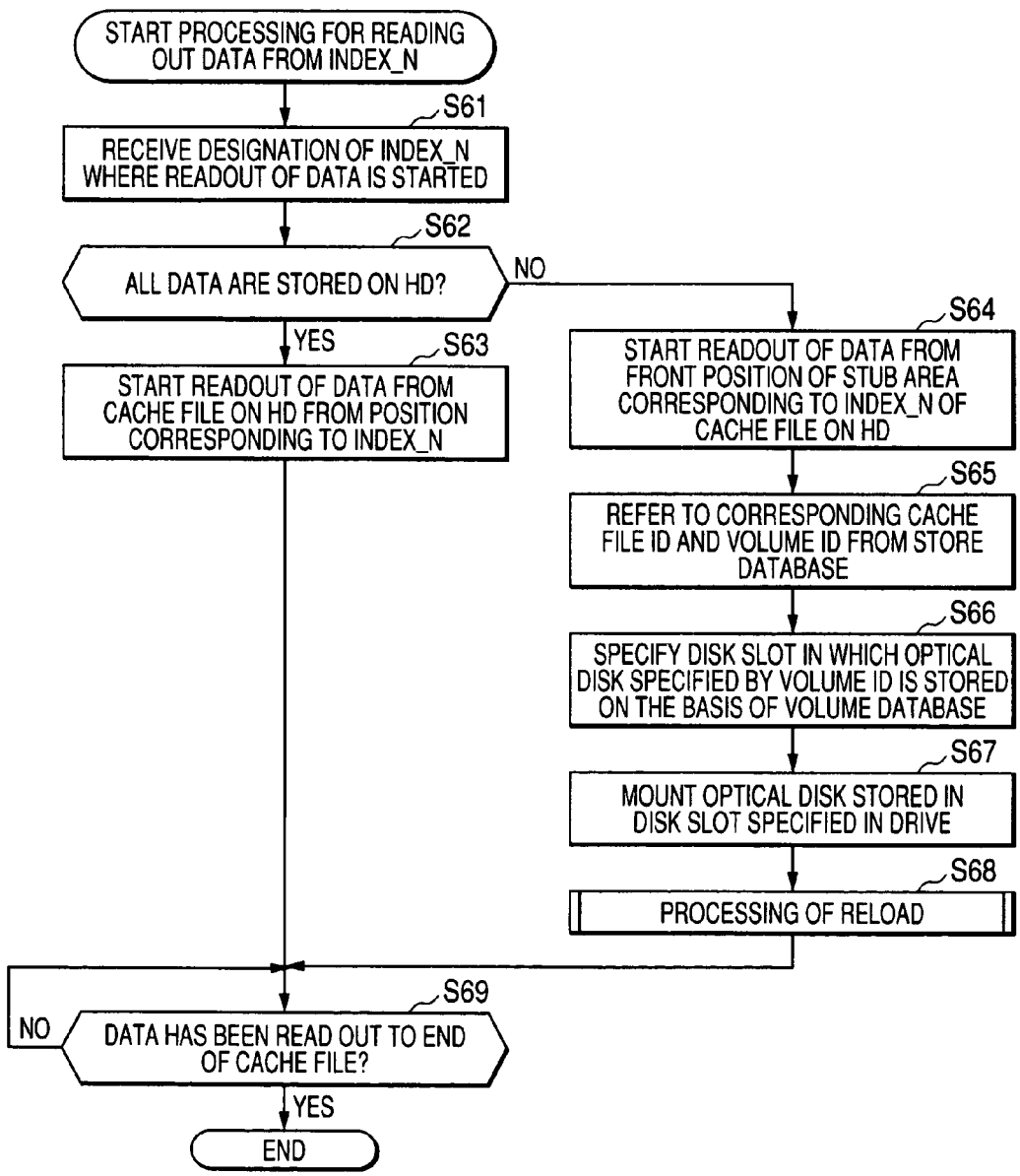
FIG. 14 is a flowchart for explaining processing for reading out data from an index_n.

FIG. 14 is a flowchart for explaining processing for reading out data from an index_n. In step S61, the file I/O manager 163 of the storage manager 114 receives designation of the index_n for starting readout of data. More specifically, the application program 141 receives selection of an index for starting reproduction corresponding to operation by the user. The application program 141 is selected by the user and supplies data designating the index for starting reproduction to the file I/O manager 163. The file I/O manager 163 acquires the data from the application program 141 to receive the designation of the index_n for starting readout of the data selected by the user. The storage manager 114 instructs the HSM 113 to reproduce the content from the index_n.

In step S62, the storage manager 114 judges, on the basis of the area information stored in the migration file system 164 of the HSM 113, whether all data of the content instructed to be read out are recorded in the HD 116 as a cache file, that is, whether all data of the content instructed to be read out are stored in the HD 116. When it is judged in step S62 that all the data are stored in the HD 116, the storage manager 114 proceeds to step S63. The storage manager 114 instructs the HSM 113 to read out data of the content from a position corresponding to the index_n. The HSM 113 causes the HD 116 to start readout of data of the cache file from the position corresponding to the index_n. After the processing in step S63, the storage manager 114 proceeds to step S69.

On the other hand, when it is judged in step S62 that all the data are not stored in the HD 116, the storage manager 114 proceeds to step S64. The storage manager 114 instructs the HSM 113 to read out data of the content from the position corresponding to the index_n. The HSM 113 causes the HD 116 to start readout of the data from a front position of a stub area corresponding to the index_n of the cache file of the HD 116.

Consequently, the content is immediately reproduced.

The storage manager 114 issues a reload command, which is a request for reading out corresponding data of the content from the optical disk 119 to the HD 116, to the HSM 113.

In step S65, the HSM 113 refers to a cache file ID and a volume ID corresponding to the reload command from the store database 166. In step S66, the storage server 165 specifies, on the basis of the volume database 168, the disk slot 121 in which the optical disk 119 specified by the volume ID is stored. In other words, the storage server 165 requests the media server 167 to specify the disk slot 121 in which the optical disk 119 specified by the volume ID is stored. The media server 167 causes the volume database 168 to search for a volume ID coinciding with the volume ID included in a request from the storage server 165 among volume IDs for specifying the optical disks 119 stored in the respective disk slots 121 of the jukebox 145. The volume database 168 outputs information indicating the disk slot 121 in which the optical disk 119 specified by the volume ID included in the request from the storage server 165 is stored. Thus, the media server 167 supplies information indicating the disk slot 121 to the storage server 165. Consequently, the storage server 165 specifies the disk slot 121 stored in the optical disk 119 specified by the volume ID.

In step S67, the storage server 165 instructs the media server 167 to mount the optical disk 119, which is stored in the disk slot 121 specified, in the drive 118. The media server 167 causes the juke system 120 to mount the optical disk 119, which is stored in the disk slot 121 specified, in the drive 118 via the changer driver 143. In other words, the picker 122 of the jukebox 145 unmounts the optical disk 119 from the disk slot 121 specified, conveys the optical disk 119, and mounts the optical disk 119 in the drive 118 under the control by the juke system 120.

In step S68, processing of reload is executed. Details of the processing of reload will be described later with reference to a flowchart in FIG. 15.

After the processing in step S68, the storage manager 114 proceeds to step S69.

In step S69, the storage manager 114 judges whether data has been read out to the end of the cache file. When it is judged that the data has not been read out to the end of the cache file, the storage manager 114 returns to step S69 and repeats the processing of judgment.

When it is judged in step S69 that the data has been read out to the end of the cache file, the storage manager 114 completes the processing.

Figure 15:
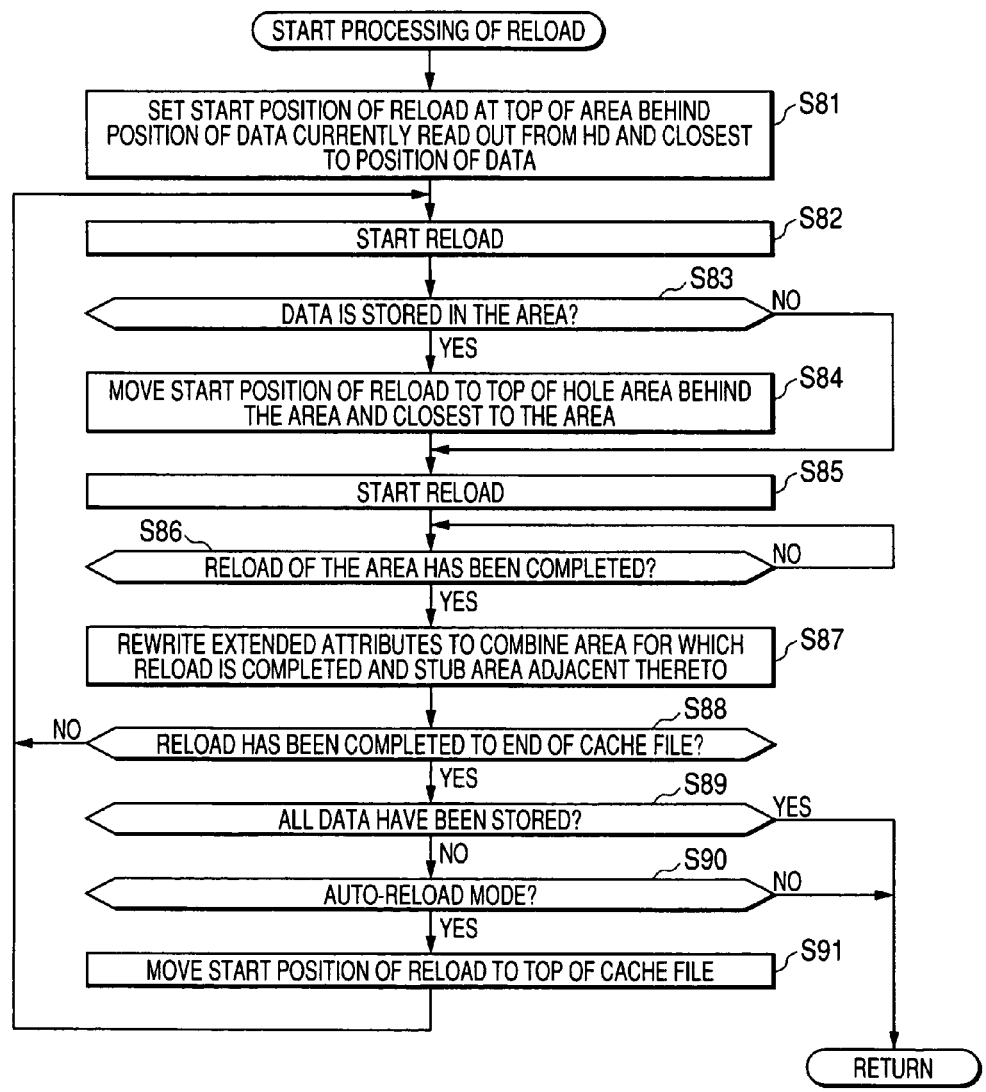
FIG. 15 is a flowchart for explaining details of processing of reload.

Details of the processing of reload in step S68 in FIG. 14 will be explained with reference to a flowchart in FIG. 15. In step S81, the storage manager 114 designates a predetermined position and instructs the HSM 113 to start reload. The migration file system 164 of the HSM 113 sets a start position for reload at the top of an area behind a position of data currently read out from the HD 116 and closest to the position of the data.

In step S82, the storage server 165 of the HSM 113 starts reload. The storage server 165 reads out data in the start position for reload from the drive 118 in which the optical disk 119 is mounted and causes the HD 116 to record the data read out to be stored in a predetermined area of the cache file.

In step S83, the migration file system 164 judges whether data is stored in the area. When it is judged that data is stored in the area, in step S84, the migration file system 164 moves the start position for reload to the top of a hole area behind the area and closest to the area. When it is judged in step S83 that data is not stored in the area, the migration file system 164 skips the processing in step S84.

In step S85, the storage server 165 of the HSM 113 starts reload.

In step S86, the migration file system 164 judges whether the reload of the area has been completed. When it is judged that the reload of the area has not been completed, the migration file system 164 returns to step S86 and repeats the processing of judgment.

When it is judged in step S86 that the reload of the area has been completed, the migration file system 164 proceeds to step S87. The migration file system 164 rewrites extended attributes to combine the area for which the reload has been completed and a stub area adjacent to the area.

In step S88, the migration file system 164 judges whether the reload has been completed to the end of the cache file. When it is judged in step S88 that the reload has been completed to the end of the cache file, the migration file system 164 proceeds to step S89. The migration file system 164 judges whether all the data of the content have been recorded in the HD 116, that is, whether all the data of the content have been stored.

When it is judged in step S89 that all the data of the content have not been stored, the migration file system 164 proceeds to step S90. The migration file system 164 judges whether the reload is performed in an auto-reload mode. When it is judged in step S90 that the reload is performed in the auto-reload mode, the migration file system 164 proceeds to step S91. The migration file system 164 moves the start position for reload to the top of the cache file, returns to step S82, and repeats the processing described above.

When it is judged in step S88 that the reloaded has not been completed to the end of the cache file, the migration file system 164 returns to step S82 and repeats the processing described above.

When it is judged in step S89 that all the data of the content have been stored or it is judged in step S90 that the reload is not performed in the auto-reload mode, the migration file system 164 completes the processing.

In this way, while the data of the content is read out from the cache file of the HD 16 and before readout of data not recorded in the cache file in advance is executed, data of hole areas is read out from the optical disk 119 mounted in the drive 118 and the data read out is stored in the cache file. The drive 118 reads out the data from the optical disk 119 at higher speed compared with readout speed for data necessary for reproduction of the content. Thus, data not stored in the cache file of the HD 116 before the reproduction of the content is started is stored in the cache file of the HD 116 before being read out for reproduction of the content. Therefore, it is possible to typically read out the data necessary for reproduction of the content from the cache file of the HD 116.

As a result, when readout of the data of the content is requested, it is possible to quickly read out the data of the content while causing little waiting time. In other words, for example, in the case of content of sound or an image, it is possible to reproduce the sound or the image without interruption.

Moreover, since the data of the content is read from the optical disk 119 first and, then, recorded in the HD 116, it is possible to release the drive 118 earlier compared with the case in which the data read out from the optical disk 119 is directly used for reproduction. In other words, it is possible to sufficiently show abilities of the drive 118 such as fast readout of data from the optical disk 119 and more efficiently use the drive 118.

Figure 16:
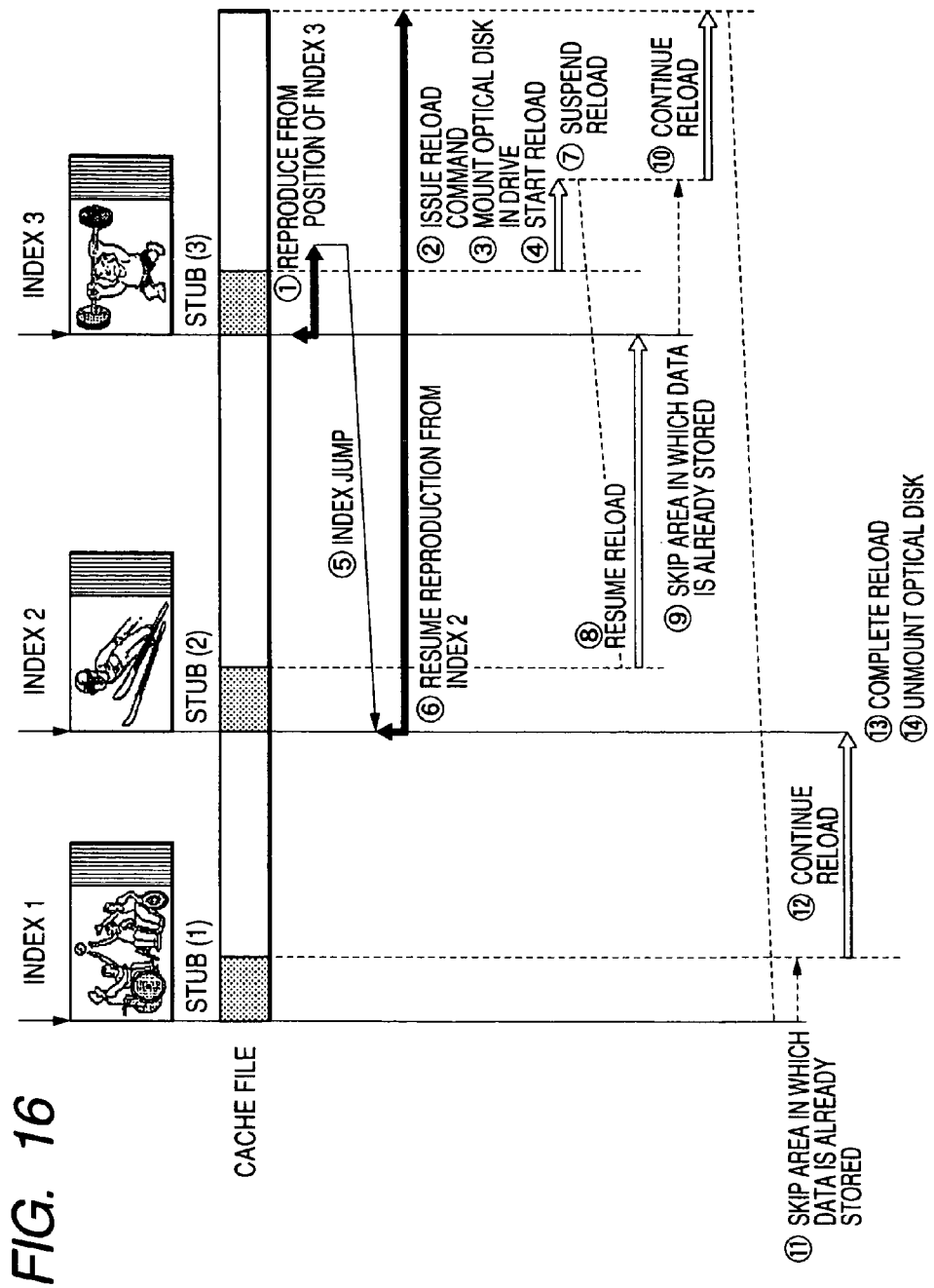
FIG. 16 is a diagram for explaining a specific example of the processing of reload.
Figure 17:
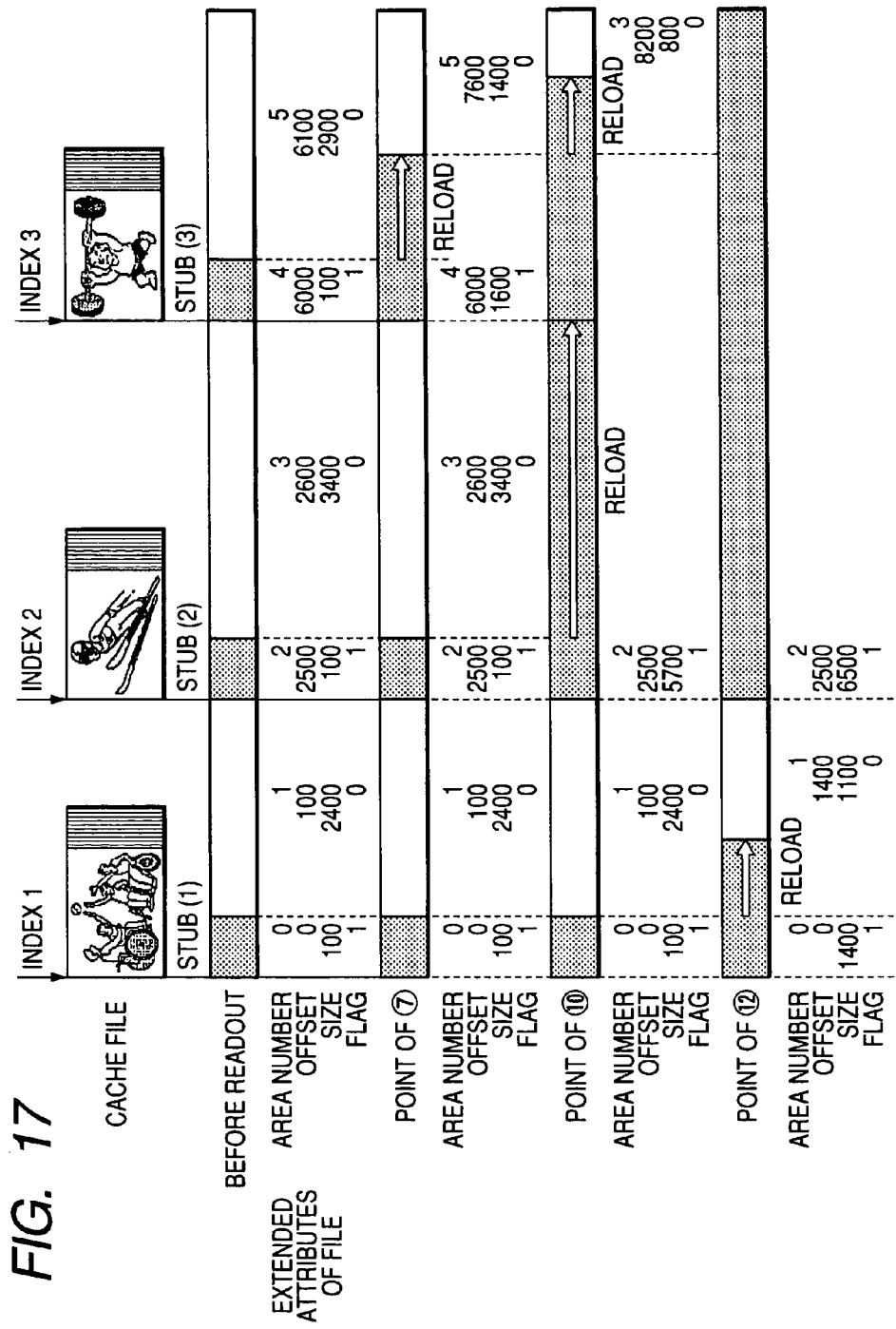
FIG. 17 is a diagram for explaining the specific example of the processing of reload.

FIGS. 16 and 17 are diagrams for explaining a specific example of the processing of reload. The processing of reload will be explained with reference to FIGS. 16 and 17. In the processing of reload, for content, stub data corresponding to respective three indexes of which are recorded in a cache file, first, reproduction from an index 3 is requested, reproduction from an index 2 is requested in the middle of the reproduction of the content, and the content continues to be reproduced to the end of the content.

When the user performs operation for selecting the index 3 as an index for starting reproduction, the application program 141 receives selection of the index 3 by the user. First, under the control by the storage manager 114, the HSM 113 causes the HD 116 to start readout of data from the front position of a stub area affixed with an area number 4 corresponding to the index 3 of the cache file of the HD 116. Reproduction of the content is started from the index 3.

As shown in FIG. 17, 100-byte stub data of a portion at the top of the content, 100-byte stub data of a position 2500 bytes apart from the top of the content, and 100-byte stub data of a position 6000 bytes apart from the top of the content are recorded in the cache file in association with the index 1, the index 2, and the index 3. Data of the other portions of the content are not recorded in the cache file.

A stub area corresponding to the index 3, that is, the 100-byte stub data of the position 6000 bytes apart from the top of the content is read out from the HD 116. Reproduction of the content is immediately started from the index 3.

In parallel with the reproduction of the content, second, the storage manager 114 causes the HSM 113 to read out data of a hole area behind the stub area of the index 3 from the optical disk 119 to the HD 116 and issues a reload command indicating a request for recording the data in the HD 116. Then, third, the optical disk 119 having recorded therein the data of the entire content started to be reproduced is mounted in the drive 118. Fourth, at a point when it is possible to read out data from the optical disk 119 mounted, data of the content corresponding to data of a hole area (an area affixed with the area number 5) behind the stub area of the index 3 is read out from the optical disk 119 mounted in the drive 118. The reload of the data of the content is started such that the data read out is stored in a hole area behind the stub area of the index 3 (stored to follow behind the stub area of the index 3) of the cache file of the HD 116.

In this case, data following the 100-byte stub data of the position 6000 bytes apart from the top of the content is read out from the optical disk 119 mounted in the drive 118. The data read out is reloaded to the hole area to follow the 100-byte stub data of the position 6000 bytes apart from the top of the content. Therefore, the data is stored in order from the top of the area affixed with the area number 5. The migration file system 164 updates the extended attributes to combine the portion stored with the area affixed with the area number 4 according to the storage of the data.

Therefore, as the processing of reload progresses, an offset position of the area in the hole state to be subjected to the processing of reload shifts to the rear side of the content (the offset increases) and a size of the area decreases.

When the user performs operation for selecting the index 2 as the index for starting reproduction, fifth, the application program 141 jumps to the index 2. Sixth, under the control by the storage manager 114, the HSM 113 causes the HD 116 to start readout of data from the front position of the stub area corresponding to the index 2 of the cache file of the HD 116. Reproduction of the content from the index 2 is immediately started.

When a position for reading out data is changed by the application program 141 with an index as a unit, reload is performed from the top of a hole area closest to the position from which the data is read out among areas in the hold state (hole areas) behind the position from which the data is read out. Thus, the processing of reload currently executed is suspended and the reload is resumed from the top of a hole area closest to a position from which the data is to be read out. Even if the position from which the data is read out is changed, when the position to which the data is currently reloaded is the top of a hole area closest to the position from which the data is read out among areas in the hole state (hole areas) behind the position changed, from which the data is read out, the processing of reload is continued.

For example, since the reproduction of the content is started from the index 2, seventh, the processing of reload of the data of the hole area behind the stub area of the index 3 is suspended.

For example, 1500-byte data following the 100-byte stub data of the position 6000 bytes apart from the top of the content is read out from the optical disk 119 mounted in the drive 118. The 1500-byte data read out is reloaded to a hole area to follow the 100-byte stub data of the position 6000 bytes apart from the top of the content. As a result, a data amount of a stub area in the position 6000 bytes apart from the top of the content is 1600 bytes (100+1500). The migration file system 164 sets a size of the area indicated by the area number 4 included in the area information of the extended attributes of the file to 1600.

Eighth, data of the content corresponding to the data of the hole area behind the stub area of the index 2 is read out from the optical disk 119 mounted in the drive 118. The reload of the data of the content is started such that the data read out is stored in the hole area behind the stub area of the index 2 of the cache file of the HD 116.

Ninth, when the reload of the hole area behind the stub area of the index 2 is completed, the areas in which data is already stored are skipped. Tenth, the processing of reload is continued such that reload of the data of the position where the processing of reload is suspended in the seventh processing, that is, the hole area behind the stub area of the index 3 is performed.

3400-byte data following the 100-byte stub data of the position 2500 bytes apart from the top of the content is read out from the optical disk 119 mounted in the drive 118. The 3400-byte data read out is reloaded to the hole area to follow the 100-byte stub data of the position 2500 bytes apart from the top of the content. As a result, reload of a hole area next to the stub area in which the 100-byte stub data of the position 2500 bytes apart from the top of the content is stored is completed. Thus, data from the position 2500 bytes apart from the top of the content to a position 7600 bytes apart from the top of the content are stored in the cache file. Consequently, the stub area affixed with the area number 2, the hole area affixed with the area number 3, and the stub area affixed with the area number 4, which are adjacent to one another, are combined into one stub area.

When an area number of the leading area is assumed to be 0, continuous values are reallocated as the area numbers of the respective areas. As a result, an area number of the stub area combined is set to 2 and an area number of the hole area affixed with the area number 5 before combining the areas is set to 3.

According to the combination of the areas, a data amount of the stub area affixed with the area number 2 is 5100 bytes (100+3400+1600). The migration file system 164 sets a size of the area affixed with the area number 2 and an offset, a size, and a flag for the area affixed with the area number 3, which are included in the area information of the extended attributes of the file, to 5100, 7600, 1400, and 0, respectively.

Reload of data of the hole area behind the stub area of the index 3, that is, the area affixed with the area number 3 according to the combination of the areas is performed. When the data of the content is reloaded to the end, the area affixed with the area number 2 and the area affixed with the area number 3 are combined.

In the auto-reload mode, when the data of the content is reloaded to the end, the remaining data not reloaded is reloaded to the cache file from the top to complete the processing. Thus, a position of the reload is moved to the top of the cache file. Eleventh, the area in which the top of the content is stored is skipped. Twelfth, the processing of reload is continued such that reload of the data of the hole area behind the stub area of the index 1 at the top of the content is performed.

As shown in FIG. 17, data following the 100-byte stub data at the top of the content is read out from the optical disk 119 mounted in the drive 118. The data read out is reloaded to a hole area next to the stub data at the top of the content.

Thirteenth, when data up to immediately before the stub area of the index 2 is stored in the cache file, the data of the entire content is stored in the cache file. Thus, the reload is completed. In this case, all the areas are combined into one area. Fourteenth, the optical disk 119 is unmounted from the drive 118 and returned to the disk slot 121.

In this way, when readout of the content, the cache file in the stub file state of which is recorded in the HD 116, is requested, the data is read out from the optical disk 119 having recorded therein the data of the entire content. The data read out is stored in the cache file. The data stored in the cache file is read out and the content is reproduced.

As described above, it is possible to further reduce occurrence of a waiting time in reading out an arbitrary portion of the content.

It is also possible that data not recorded in the cache file is read out from the optical disk 119 and the content is directly reproduced from the data read out from the optical disk 119.

Figure 18:
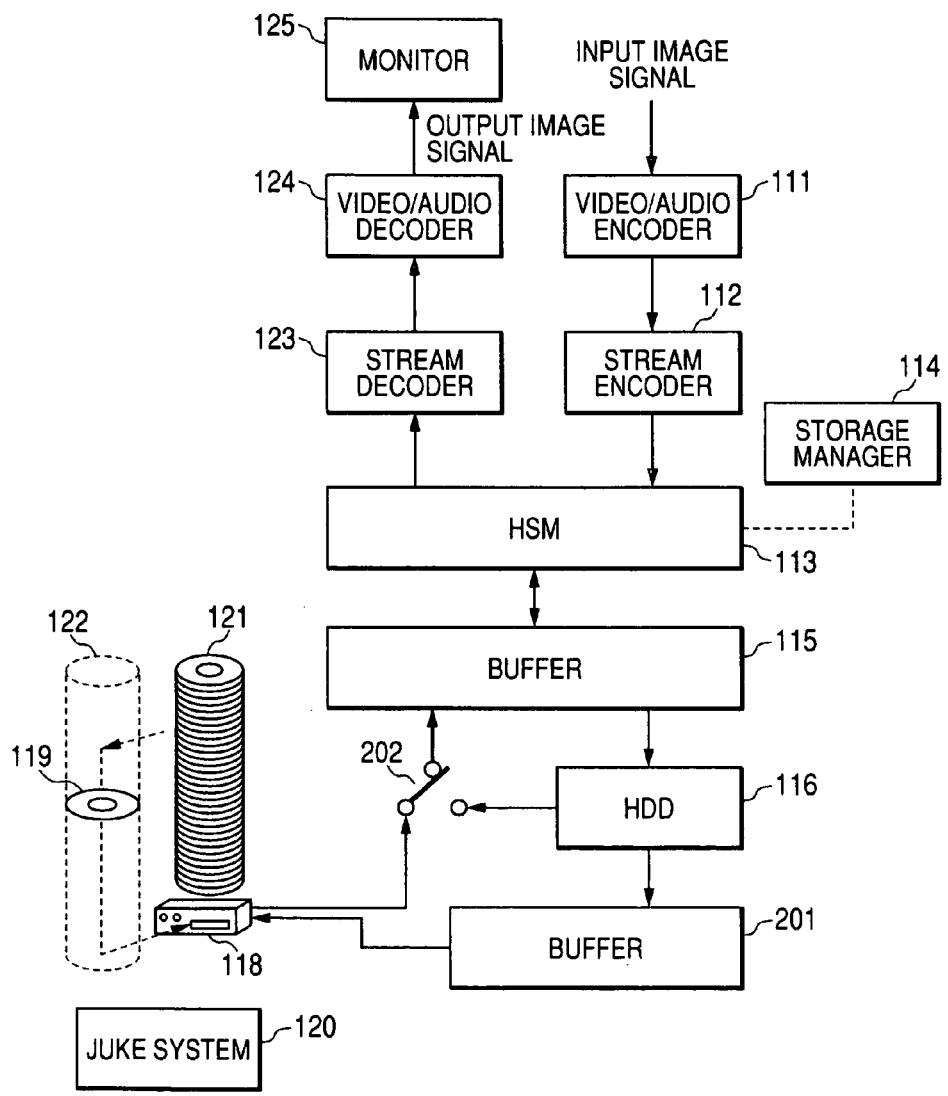
FIG. 18 is a block diagram showing another structure of the recording and reproducing system according to the embodiment of the invention.

FIG. 18 is a block diagram showing another structure of the recording and reproducing system 101 according to the embodiment of the invention in this case. Components identical with those shown in FIG. 3 are denoted by the identical reference numerals and signs. Explanations of the components are omitted.

The HD 116 supplies a stream (data) recorded therein to a buffer 201 or a selector 202.

The buffer 201 includes a recording area of a part of a semiconductor memory or the HD 116. The buffer 201 temporarily stores the stream (the data) supplied from the HD 116 and supplies the stream (the data) stored therein to the drive 118.

The selector 202 selects one of data outputted from the driver 118 and data outputted from the HD 116 under the control by the HSM 113. The buffer 115 acquires one of the data outputted from the drive 118 and the data outputted from the HD 116 selected by the selector 202 and stores the data acquired.

The selector 202 may be provided as hardware. Alternatively, a function equivalent to the selector 202 may be realized by software (processing).

The selector 202 may select one of the data outputted from the drive 118 and the data outputted from the HD 116 under the control by the storage manager 114.

Figure 19:
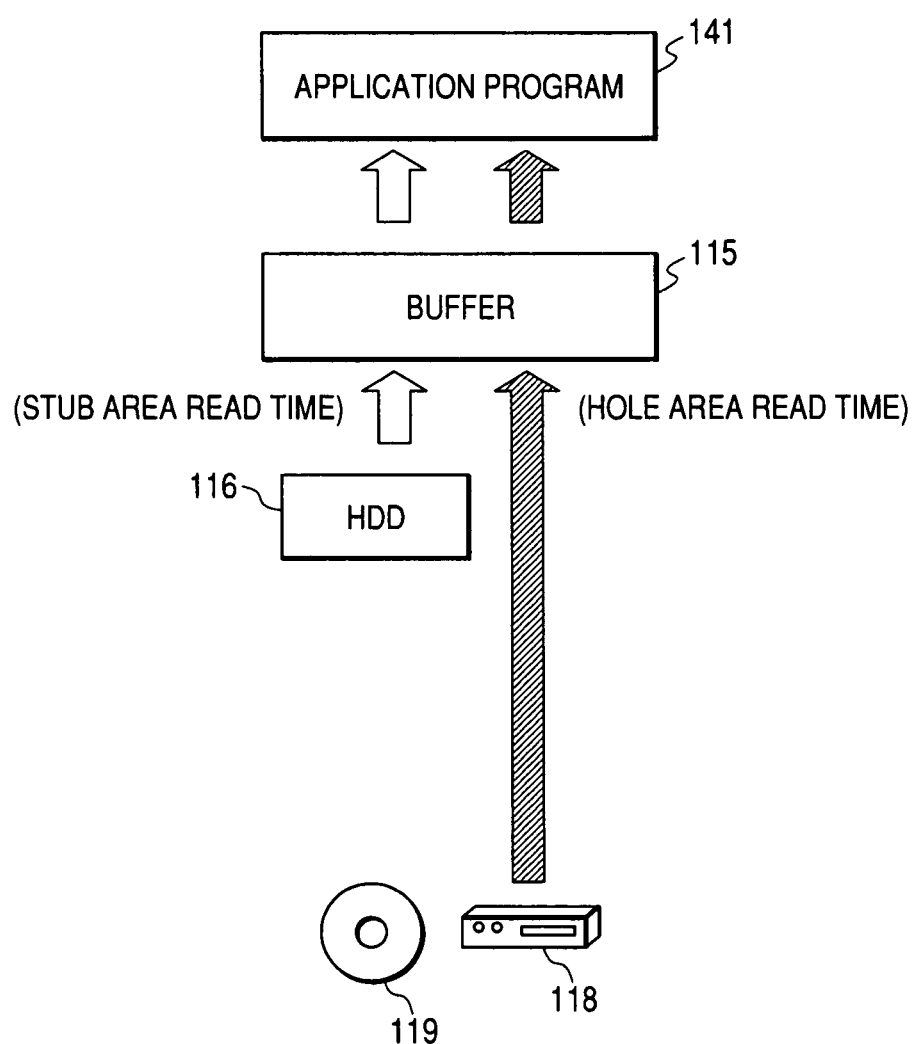
FIG. 19 is a diagram for explaining readout of data of content that uses a cache file.

When data not recorded in the cache file is read out from the optical disk 119 and the content is directly reproduced from the data read out from the optical disk 119, as shown in FIG. 19, the data stored in the cache file of the HD 116 is read out from the HD 116 and the data not stored in the cache file of the HD 116 is read out from the optical disk 119, which is mounted in the drive 118, by the drive 118.

In other words, data of a stub area recorded in the HD 116 in advance is read out from the HD 116 to the buffer 115 and temporarily stored in the buffer 115. Data of a hole area not recorded in the HD 116 in advance is read out from the optical disk 119, directly supplied to the buffer 115 without being recorded by the HD 116, and temporarily stored in the buffer 115.

The application program 141 reads out the data temporarily stored in the buffer 115 and outputs an output image signal and sound signal.

Figure 20:
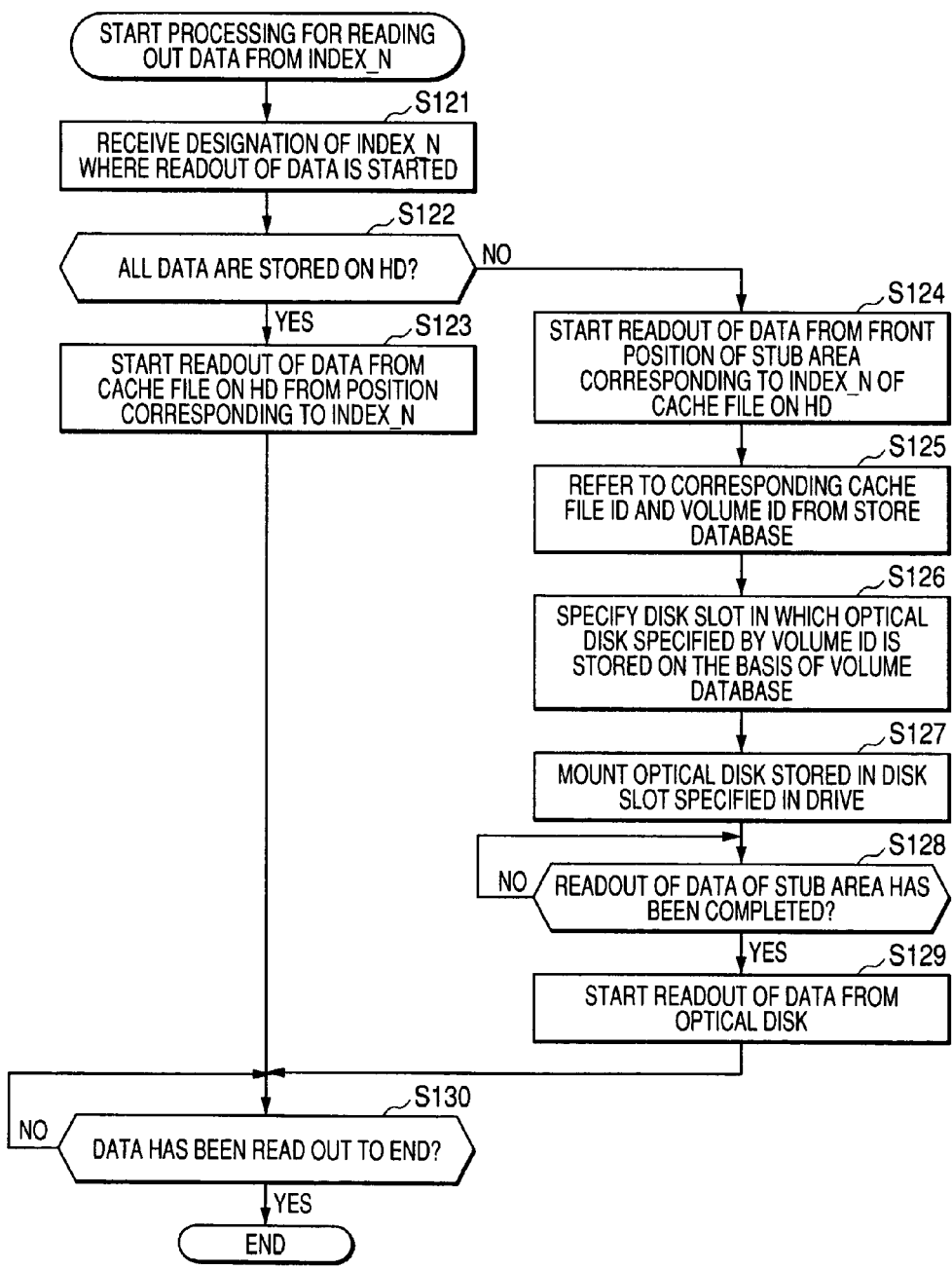
FIG. 20 is a flowchart for explaining processing for reading out data from an index_n.

FIG. 20 is a flowchart for explaining processing for reading out data from the index_n in the case in which the data not recorded in the cache file is read out from the optical disk 119 and the content is directly reproduced from the data read out from the optical disk 119. Since processing in steps S121 to S123 is the same as the processing in steps S61 to S63 in FIG. 14, an explanation of the processing is omitted.

In step S124, the storage manager 114 instructs the HSM 113 to read out the data of the content from a position corresponding to the index_n. The HSM 113 causes the HD 116 to start readout of the data from the front position of a stub area corresponding to the index_n of the cache file.

The storage manager 114 issues a command of a request for reading out the data of the content from the optical disk 119 to the HSM 113.

In step S125, as in the processing in step S65, the HSM 113 refers to a cache file ID and a volume ID corresponding to the command from the store database 166. In step S126, as in the processing in step S66, the storage server 165 specifies, on the basis of the volume database 168, the disk slot 121 in which the optical disk 119 specified by the volume ID is stored.

In step S127, as in the processing in step S67, the storage server 165 instructs the media server 167 to mount the optical disk 119, which is stored in the disk slot 121 specified, in the drive 118. The media server 167 causes the juke system 120 to mount the optical disk 119, which is stored in the disk slot 121 specified, in the drive 118 via the changer driver 143.

In this way, the optical disk 119 is mounted in the drive 118 in the background while the data is read out from the cache file of the HD 116.

In step S128, the HSM 113 judges whether the readout of the data of the stub area, which is the data recorded in the HD 116, has been completed. When it is judged that the readout of the data of the stub area has not been completed, the HSM 113 returns to step S128 and repeats the processing of judgment. When it is judged in step S128 that the readout of the data of the stub area has been completed, the HSM 113 proceeds to step S129. The HSM 113 causes the drive 118 to start readout of the data from the optical disk 119 mounted therein. More specifically, the migration file system 164 of the HSM 113 sets a start position of the readout of the data from the optical disk 119 as the top of a hole area behind a position of the data being currently read out from the HD 116, which is a hole area closest to the position. The storage server 165 causes the drive 118 in which the optical disk 119 is mounted to read out the data in the start position. The data read out from the drive 118 is supplied to the stream decoder 123.

After the processing in step S129, the storage manager 114 proceeds to step S130.

In step S130, the storage manager 114 judges whether the data has been read out to the end of the content. When it is judged that the data has not been read out to the end of the content, the storage manager 114 returns to step S130 and repeats the processing of judgment.

When it is judged in step S130 that the data has been read out to the end of the content, the storage manager 114 completes the processing.

Consequently, it is possible to further reduce accesses to the HD 116. It is also possible to further reduce an amount of use of the recording area of the HD 116.

After the optical disk 119 is mounted in the drive 118, it is possible to quickly read out data of an arbitrary portion on the content including hole areas.

The processing of the recording and reproducing system 101 shown in FIG. 3 and the processing of the recording and reproducing system 101 shown in FIG. 18 may be adaptively switched.

Moreover, it is also possible to transmit recorded content via a network.

Figure 21:
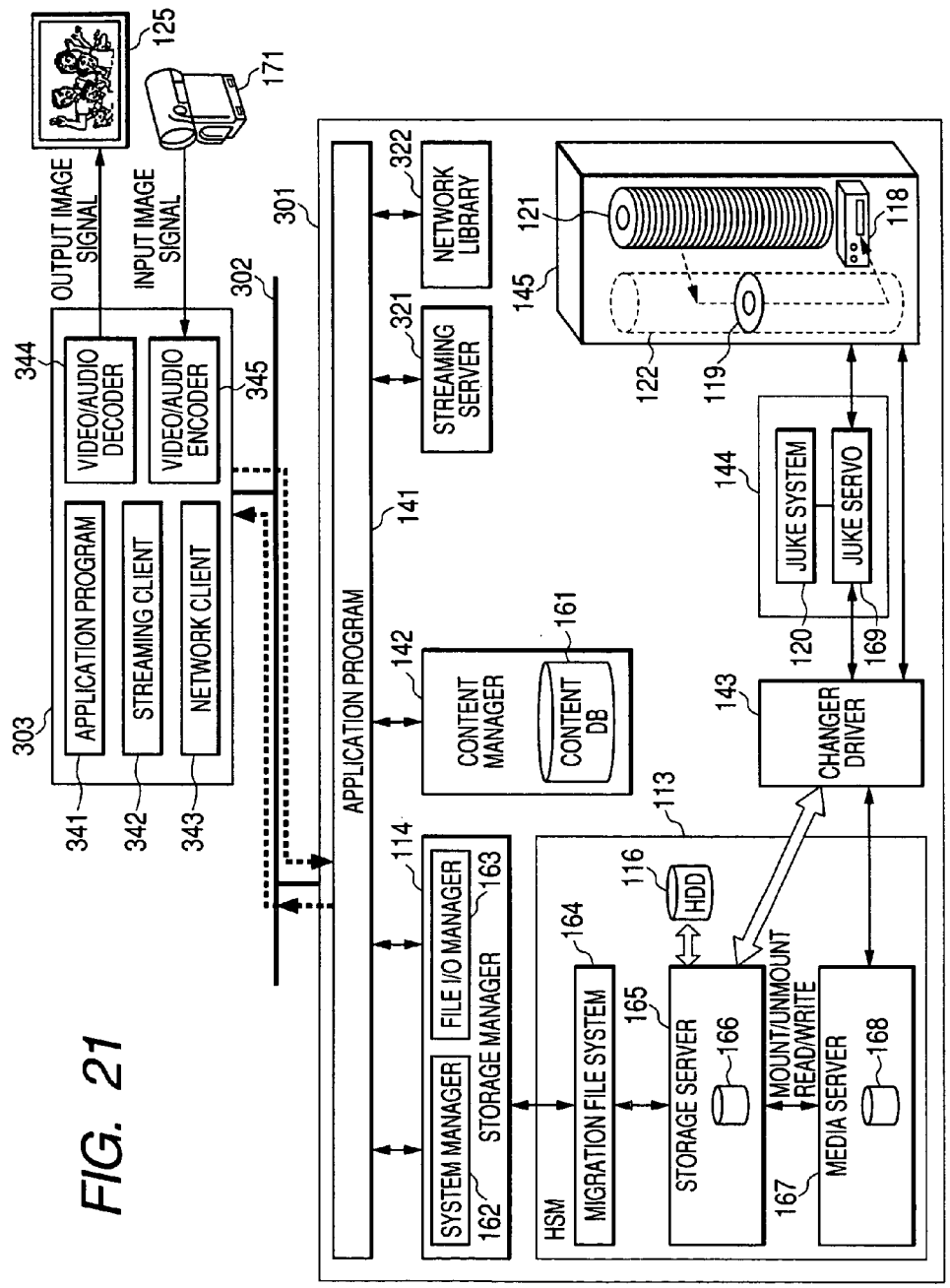
FIG. 21 is a block diagram showing still another structure of the recording and reproducing system according to the embodiment of the invention.

FIG. 21 is a block diagram showing still another structure of the recording and reproducing system according to the embodiment of the invention that transmits recorded content via a network. Components identical with those shown in FIG. 3 are denoted by the identical reference numerals and signs. Explanations of the components are omitted.

In this case, the recording and reproducing system includes a server 301 and a client 303 connected to the server 301 via a network 302.

The server 301 includes the HSM 113, the storage manager 114, the application program 141, the content manager 142, the changer driver 143, the jukebox control unit 144, the jukebox 145, a streaming server 321, and a network library 322.

The application program 141 receives a stream including image data and sound data transmitted from the client 303 via the network 302 and supplies the stream received to the storage manager 163. The application program 141 causes the streaming server 321 to transmit the stream supplied from the storage manager 163.

The streaming server 321 transmits the stream supplied from the application program 141 to the client 303 via the network 302 on the basis of a procedure described as the network library 322. When data for requesting reproduction of the content from a predetermined position (a transmission request for a stream) transmitted from the client 303 is received, the streaming server 321 transmits a stream for reproducing the content from the requested position to the client 303 via the network 302.

A procedure for transmitting or receiving a stream or data via the network 302 is described in the network library 322.

The network 302 includes a local area network (LAN) such as a home network, the Internet, a public line, a leased line, or the like using a wireless or wired transmission medium and transmits various data (including streams).

The client 303 includes an application program 341, a streaming client 342, a network client 343, a video/audio decoder 344, and a video/audio encoder 345.

The application program 341 has a function of an interface with a user and acquires an instruction from the user or notifies the user of various kinds of information concerning the client 303. The application program 141 controls the entire client 303.

The streaming client 342 receives a stream transmitted from the server 301 via the network 302 and supplies the stream received to the video/audio decoder 344. The network client 343 transmits various data to and receives various data from the server 301 via the network 302. The network client 343 transmits a stream supplied from the video/audio encoder 345 to the server 301 via the network 302. The network client 343 transmits data for requesting reproduction of content from a desired position (a transmission request for a stream) to the server 301 via the network 302.

The video/audio decoder 344 separates the stream into image data and sound data. The video/audio decoder 344 decodes image data and sound data encoded into image data and sound data of a so-called baseband and supplies an output image signal and sound signal (not shown) based on the image data and the sound data of the baseband obtained by the decoding to the monitor 125.

The video/audio encoder 345 acquires an input image signal and sound signal from the video camera 171 and converts the input image signal and sound signal acquired into image data and sound data of a baseband. The video/audio encoder 345 encodes the image data and the sound data of the baseband and multiplexes the image data and the sound data encoded to generate a stream. The video/audio encoder 345 supplies the stream generated to the network client 343.

In this way, the server 301 can quickly transmit the stream for reproducing the content from the desired position to the client 303 via the network 302.

As described above, according to the invention, it is possible to further reduce occurrence of a waiting time in reading out an arbitrary portion of the content.

Other fast recording media such as a semiconductor memory may be used as the primary storage instead of the HD 116. Other recording media traded at a low price per recording capacity compared with the primary storage such as a magnetic disk and a magnetic tape may be used as the secondary storage instead of the optical disk 119.

The series of processing described above can be executed by hardware or can be executed by software. When the series of processing is executed by software, a program constituting the software is installed in a computer built in dedicated hardware or, for example, a general-purpose personal computer capable of executing various functions by installing various programs.

Figure 22:
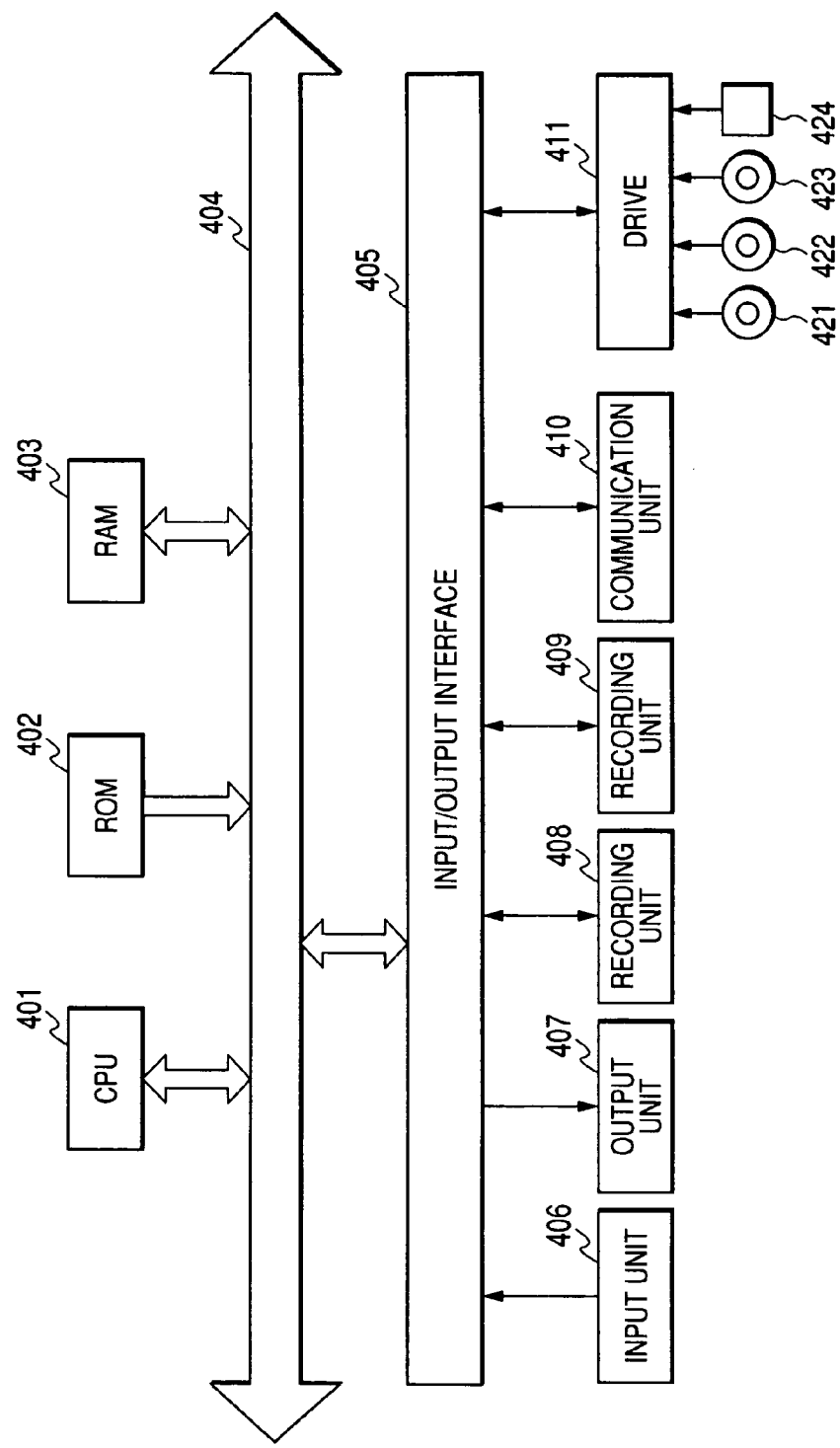
FIG. 22 is a block diagram showing an example of a structure of a personal computer.

FIG. 22 is a block diagram showing an example of a structure of a personal computer that executes the series of processing according to a program. A central processing unit (CPU) 401 executes various kinds of processing in accordance with a program stored in a read only memory (ROM) 402, a recording unit 408, or a recording unit 409. Programs executed by the CPU 401, data, and the like are appropriately stored in a random access memory (RAM) 403. The CPU 401, the ROM 402, and the RAM 403 are connected to one another by a bus 404.

As the CPU 401, it is possible to adopt the Cell described in "Cell is produced", Nikkei Electronics, Nikkei Business Publications, Inc., Feb. 28, 2005, pages 89 to 117.

An input/output interface 405 is connected to the CPU 401 via the bus 404. An input unit 406 including a keyboard, a mouse, and a microphone and an output unit 407 including a display and a speaker are connected to the input/output interface 405. The CPU 401 executes various kinds of processing in response to instructions inputted from the input unit 406. The CPU 401 outputs results of the processing to the output unit 407.

The recording unit 408 connected to the input/output interface 405 corresponds to, for example, the HD 116 and records the programs executed by the CPU 401 and the various data. The recording unit 409 corresponds to, for example, the jukebox 145 and records the various data and the programs executed by the CPU 401. The communication unit 410 communicates with external apparatuses such as the client 303 via the network 302 such as the Internet or a LAN.

A program may be acquired via the communication unit 410 and recorded in the recording unit 408 or the recording unit 409.

When a magnetic disk 421, an optical disk 422, a magneto-optical disk 423, a semiconductor memory 424, or the like is mounted in a drive 411 connected to the input/output interface 405, the drive 411 drives the magnetic disk 421, the optical disk 422, the magneto-optical disk 423, the semiconductor memory 424, or the like and acquires programs, data, and the like recorded therein. The programs and the data acquired are transferred to the recording unit 408 or the recording unit 409 if necessary and recorded therein.

As shown in FIG. 22, a recording medium having stored therein the program for performing the series of processing is constituted by package media having the program recorded therein including the magnetic disk 421 (including a flexible disk), the optical disk 422 (including a compact disc-read only memory (CD-ROM) and a digital versatile disc (DVD)), the magneto-optical disk 423 (including a mini-disc (MD) (trademark)), the semiconductor memory 424, or the like that is distributed to provide the user with the program separately from the computer. Besides, the recording medium is constituted by a ROM 402, a hard disk included in the recording unit 408, the optical disk 119 included in the recording unit 409, or the like having the program recorded therein that is provided to the user in a state in which the ROM 402, the hard disk, the optical disk 119, or the like is built in the computer in advance.

The program for executing the series of processing may be installed in the computer via a wired or wireless communication medium such as a local area network, the Internet, or a digital satellite broadcast and, if necessary, via an interface such as a router or a modem.

In this specification, steps describing the program stored in the recording medium includes not only processing performed in time series according to the order described but also processing executed in parallel or individually, although not always processed in time series.

In this specification, the system represents an entire apparatus including plural devices.

As described above, it is possible to reduce occurrence of a waiting time in reading out an arbitrary portion of the content.

It should be understood by those skilled in the art that various modifications, combinations, sub-combinations, and alterations may occur depending on design requirements and other factors insofar as they are within the scope of the appended claims or the equivalents thereof.

The invention claimed is:

1. A readout device, comprising:
a first recording medium having recorded therein data of arbitrary plural portions of an entire content file and having a period of a predetermined length in temporally continuous content, wherein a first plural portion among the plural portions is temporally spaced apart from a second plural portion among the plural portions next temporally following the first plural portion in the continuous content, and wherein content corresponding to the data of the second plural portion is not continuous with content corresponding to the data of the first plural portion in the continuous content;
a second recording medium having recorded therein data of the entire content file; and
readout control means for controlling, when all data of content requested to be read out, the requested content including one of the plural portions of the entire content file, is judged not stored on the first recording medium, the readout, in parallel, of data of the one portion from the first recording medium and, from the second recording medium, of data of a predetermined length of the entire content file following the data of the entire content file corresponding to the one portion, such that the data of the predetermined length read out from the second recording medium is reproducible without interruption following the reproduction of the data of the one portion read out from the first recording medium,
in which the period of the predetermined length of each of the plural portions has a respective readout or reproduce time associated therewith which is longer than a time for the readout of the respective data from the second recording medium to begin after a request for readout of the respective data is made.

2. A readout device according to claim 1, wherein data of one entire content file is recorded in any one of plural second recording media, the readout device further comprising:
readout means for reading out the data from the second recording medium;
mounting means for mounting the second recording medium in the readout means; and mounting controlling means for controlling the mounting means, in a period in which data is read out from the first recording medium, to mount in the readout means, from among the plural second recording media, the second recording medium having recorded therein data following the data read out from the first recording medium.

3. A readout device according to claim 1, further comprising receiving means for receiving, according to an operation of a user, the designation of one portion at which the readout of data is started from among the plural portions in the first recording medium, wherein
the readout control means controls the readout of data from the first recording medium and from the second recording medium such that data of the designated portion recorded in the first recording medium is read out and data following the data read out from the first recording medium is read out from the second recording medium.

4. A readout device according to claim 1, wherein the readout control means controls the readout of data from the second recording medium such that data following the data read out from the first recording medium, which is data not recorded in the first recording medium, is read out from the second recording medium.

5. A readout device according to claim 1, wherein the readout control means controls the readout of data from the second recording medium such that the data is read out at a high readout speed compared with a normal readout.

6. A readout device according to claim 1, wherein the readout control means controls the readout of data from the first recording medium such that data read out from the second recording medium, which follows the data of portions recorded in the first recording medium in advance, is recorded in the first recording medium following the data of the respective portions and, then, data of a portion and data following the data of the portion are read out from the first recording medium.

7. A readout device according to claim 6, wherein the readout control means records in the first recording medium data read out from the second recording medium which is not recorded in the first recording medium in advance.

8. A readout device according to claim 6, wherein the readout control means records data of the entire content file in the first recording medium on the basis of data read out from the second recording medium when the readout of data of the content file is requested.

9. A readout method for a readout device that reads out data from a first recording medium having recorded therein data of arbitrary plural portions of an entire content file and having a period of a predetermined length in temporally continuous content, wherein a first plural portions among the plural portions is temporally spaced apart from a second plural portion among the plural portions next temporally following the first plural portion in the continuous content and wherein content corresponding to the data of the second plural portion is not continuous with content corresponding to the data of the first plural portion in the continuous content, and data from a second recording medium having recorded therein data of the entire content file, the readout method comprising:
controlling, when all data of content requested to be read out, the requested content including one of the plural portions of the entire content file, is judged not stored on the first recording medium, the readout, in parallel, of the data of the one portion from the first recording medium and, from the second recording medium, of data of a predetermined length of the entire content file following the data of the entire content file corresponding to the one plural portion, such that the data of the predetermined length read out from the second recording medium is reproducible without interruption following the reproduction of the data of the one portion read out from the first recording medium,
in which the period of the predetermined length of each of the plural portions has a respective readout or reproduce time associated therewith which is longer than a time for the readout of the respective data from the second recording medium to begin after a request for readout of the respective data is made.

10. A non-transitory recording medium having stored thereon a program that causes a processor for a readout device that reads out data from a first recording medium having recorded therein data of arbitrary plural portions of an entire content file and having a period of a predetermined length in temporally continuous content, wherein a first plural portion among the plural portions is temporally spaced apart from a second plural portion among the plural portions next temporally following the first plural portion in the continuous content and wherein content corresponding to the data of the second plural portion is not continuous with content corresponding to the data of the first plural portion in the continuous content, and data from a second recording medium having recorded therein data of the entire content file to execute processing, the program comprising:
controlling, when all data of content requested to be read out, the requested content including one of the plural portions of the entire content file, is judged not stored on the first recording medium, the readout, in parallel, of the data of the one portion from the first recording medium and, from the second recording medium, of data of a predetermined length of the entire content file following the data of the entire content file corresponding to the one plural portion, such that the data of the predetermined length read out from the second recording medium is reproducible without interruption following the reproduction of the data of the one portion read out from the first recording medium,
in which the period of the predetermined length of each of the plural portions has a respective readout or reproduce time associated therewith which is longer than a time for the readout of the respective data from the second recording medium to begin after a request for readout of the respective data is made.

11. A readout device, comprising:
a first recording medium having recorded therein data of arbitrary plural portions of an entire content file and having a period of a predetermined length in temporally continuous content, wherein a first plural portion among the plural portions is temporally spaced apart from a second plural portion among the plural portions next temporally following the first plural portion in the continuous content and wherein content corresponding to the data of the second plural portion is not continuous with content corresponding to the data of the first plural portion in the continuous content;
a second recording medium having recorded therein data of the entire content file; and
a readout control configured to control, when all data of content requested to be read out, the requested content including one of the plural portions of the entire content file, is judged not stored on the first recording medium, the readout, in parallel, of data of the one portion from the first recording medium and, from the second recording medium, of data of a predetermined length of the entire content file following the data of the entire content file corresponding to the one portion, such that the data of the predetermined length read out from the second recording medium is reproducible without interruption following the reproduction of the data of the one portions read out from the first recording medium, in which the period of the predetermined length of each of the plural portions has a respective readout or reproduce time associated therewith which is longer than a time for the readout of the respective data from the second recording medium to begin after a request for readout of the respective data is made.

* * * * *